US011377593B2

(12) United States Patent
Daicho et al.

(10) Patent No.: US 11,377,593 B2
(45) Date of Patent: Jul. 5, 2022

(54) PHOSPHOR

(71) Applicants: KOITO MANUFACTURING CO., LTD., Tokyo (JP); TOKYO INSTITUTE OF TECHNOLOGY, Tokyo (JP); NATIONAL UNIVERSITY CORPORATION NAGOYA UNIVERSITY, Nagoya (JP)

(72) Inventors: Hisayoshi Daicho, Shizuoka (JP); Yu Shinomiya, Shizuoka (JP); Kiminori Enomoto, Shizuoka (JP); Hideo Hosono, Tokyo (JP); Satoru Matsuishi, Tokyo (JP); Hiroshi Sawa, Nagoya (JP); Akitoshi Nakano, Nagoya (JP)

(73) Assignees: KOITO MANUFACTURING CO., LTD., Tokyo (JP); TOKYO INSTITUTE OF TECHNOLOGY, Tokyo (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 154 days.

(21) Appl. No.: 16/552,502

(22) Filed: Aug. 27, 2019

(65) Prior Publication Data
US 2019/0382657 A1 Dec. 19, 2019

Related U.S. Application Data

(63) Continuation of application No. PCT/JP2018/004247, filed on Feb. 7, 2018.

(30) Foreign Application Priority Data

Feb. 28, 2017 (JP) .............................. JP2017-037510

(51) Int. Cl.
C09K 11/77 (2006.01)

(52) U.S. Cl.
CPC ...... *C09K 11/7733* (2013.01); *C09K 11/7731* (2013.01); *C09K 11/7786* (2013.01); *C09K 11/7791* (2013.01)

(58) Field of Classification Search
CPC ...................... C09K 11/7733; C09K 11/7739
See application file for complete search history.

(56) References Cited

U.S. PATENT DOCUMENTS

2007/0007494 A1 1/2007 Hirosaki et al.
2009/0140205 A1 6/2009 Kijima et al.
(Continued)

FOREIGN PATENT DOCUMENTS

JP 2005-093912 A 4/2005
JP 3837588 B2 10/2006
(Continued)

OTHER PUBLICATIONS

Krivovichev. The crystal structure of Nacaphite, Na2Ca(PO4)F: a re-investigation (Abstract). The Canadian Mineralogist (2007) 45 (4): 915-920. (Year: 2007).*

(Continued)

*Primary Examiner* — Matthew E. Hoban
(74) *Attorney, Agent, or Firm* — Buchanan Ingersoll & Rooney PC

(57) ABSTRACT

In a phosphor according to an aspect, an emission site has a perovskite crystal structure expressed by $ABX_3$, in which A and B are each a cation and X is an anion, and an emission element is located at a B site serving as a body center of the perovskite crystal structure.

8 Claims, 25 Drawing Sheets

(56) References Cited

U.S. PATENT DOCUMENTS

| | | | |
|---|---|---|---|
| 2012/0049116 A1* | 3/2012 | Lyons | C09K 11/7739 252/301.4 P |
| 2017/0058198 A1 | 3/2017 | Daicho et al. | |
| 2017/0369776 A1* | 12/2017 | Luchinger | H01L 33/504 |

FOREIGN PATENT DOCUMENTS

| | | |
|---|---|---|
| JP | 2008-106224 A | 5/2008 |
| JP | 2012-036303 A | 2/2012 |
| JP | 2013-001877 A | 1/2013 |
| JP | 2017-043764 A | 3/2017 |
| JP | 2017-171706 A | 9/2017 |
| JP | 2018-002712 A | 1/2018 |
| WO | 2017/142089 A1 | 8/2017 |

OTHER PUBLICATIONS

Daicho, H. et al., "A novel red-emitting K2Ca(P04)F:Eu2+ phosphor with a large Stokes shift", Chemical Communications, 2018, 54, 884-887, published online Dec. 6, 2017. (5 pages).

Ye, Shi et al., "Structural effects on Stokes and anti-Stokes luminescence of double-perovskite (Ba,Sr)2CaMoO6:Yb3+, Eu3+", Journal of Applied Physics, 2011, 110, 013517. (5 pages).

Jia, Weiyi et al., "Emission of Pr3+ from two sites in CaHfO3 perovskite". Journal of Luminescence, 2007, 122-123, 55-57 (3 pages).

Selvadurai, A. P. Blessington et al., "Investigation of structural and optical spectroscopy of 5% Pr doped BiO.5Na0.5)TiO3 ferroelectric ceramics: site depended study". Journal of Materials Science: Materials in Electronics, Jul. 3, 2015, 26, 7655-7665. (11 pages).

Sletnes, M. et al., "Photoluminescence of A- and B-site Eu3+-substituted (SrxBa1-x) 2CaWyMo1-yO6 phosphors", Journal of Solid State Chemistry, 2016, 237, 72-80. (9 pages).

Ueda et al., "Luminescence from rare-earth ions occupying A or B sites in perovskite-type LaScO3", 2016, 1C23, Lecture proceedings of 29th fall symposium of non-profit incorporated association, The Ceramic Society of Japan. (1 page).

Nagamizu, Kota et al., "XAFS analysis of stannate fluorescent material with perovskite structure to which rare-earth added". (2010), Extended Abstracts of the 57th spring Meeting; The Japan Society of Applied Physics and the Related Societies (3 pages).

Nakano et al., "Synchrotron powder X-ray structural analysis of the red phosphor with Eu. 2+. -doped halo-phosphate composition", (Mar. 2016) Lecture proceedings of 63th spring academic lecture of The Japan Society for Applied Physics, 21p-S423-11. (2 pages).

Enomoto, Kim.inori et al., "Blue light emission characteristics of Eu2+ activated halo-phosphate fluorescent material". Mar. 3, 2016), Lecture proceedings of 63th spring academic lecture of The Japan Society for Applied Physics (2 pages).

International Preliminary Report on Patentability (Form PCT/IB/373) and the Written Opinion of the International Searching Authority (Form PCT/ISA/237) dated Sep. 3, 2019, in corresponding international Application No. PCT/JP2018/004247. (21 pages).

International Search Report (Form PCT/ISA/210) dated Apr. 3, 2018, in corresponding international Application No. PCT/JP2018/004247. (3 pages).

Notification of Reasons for Refusal dated Aug. 31, 2021, by the Japanese Patent Office in corresponding Japanese Patent Application No. 2019-502839 and an English translation of the Notification. (9 pages).

Decision of Refusal dated Mar. 8, 2022, by the Japanese Patent Office in corresponding Japanese Patent Application No. 2019-502839 and an English translation of the Decision. (6 pages).

* cited by examiner

//PHOSPHOR

CROSS-REFERENCE TO RELATED APPLICATIONS

This application is based upon and claims the benefit of priority from the prior Japanese Patent Application No. 2017-037510, filed on Feb. 28, 2017 and International Patent Application No. PCT/JP2018/004247, filed on Feb. 7, 2018, the entire content of each of which is incorporated herein by reference.

BACKGROUND OF THE INVENTION

1. Field of the Invention

The present invention relates to phosphor.

2. Description of the Related Art

In recent years, white light-emitting diodes (LEDs) are becoming widespread as light sources alternative to fluorescent lamps and incandescent lamps. Like conventional light sources, white LEDs are desired to exhibit high color rendering properties comparable to those of natural light. Currently mainstream white LEDs are typically constituted by a combination of a blue-emission semiconductor light-emitting device and a yellow phosphor.

However, pseudo-white obtained by combining blue light and yellow light is short on a red component, making it difficult to achieve high color rendering properties. Accordingly, in order to achieve high color rendering properties, a white LED with a mixed phosphor in which a red phosphor for supplying a red component is combined with a yellow phosphor (or a green phosphor) has been conceived.

Various red phosphors have been developed to date, and a red phosphor having a composition of $CaAlSiN_3$:Eu, $(Ca,Sr)AlSiN_3$:Eu, or $Ca_2Si_5N_8$:Eu, for example, has been developed (see patent documents 1 to 3).

patent document 1: JP3837588
  patent document 2: JP2008-106224
  patent document 3: JP2005-093912

Existing red phosphors, however, are mainly nitride phosphors, including the phosphors with the aforementioned compositions. Synthesizing a nitride phosphor requires a specialized environment, such as a deoxidized atmosphere or a high-temperature and high-pressure environment, leading to an increase in the manufacturing cost.

In addition, the aforementioned red phosphors have an excitation edge in a range of 500 nm to 550 nm. Therefore, when such a red phosphor is used with another phosphor that emits light in a different color in order to achieve white light, the red phosphor absorbs light emitted by a blue phosphor, a green phosphor, a yellow phosphor, or the like and converts these colors to red. This may result in an issue that the chromaticity largely deviates from a desired emission color in response to a subtle variation in the content or the application mode of the phosphors, making the color adjustment difficult. In addition, the luminous efficacy may decrease.

SUMMARY OF THE INVENTION

The present invention has been made in view of the above issues and is directed to providing a novel phosphor.

To address the foregoing issue, in a phosphor according to an aspect of the present invention, an emission site has a perovskite crystal structure expressed by $ABX_3$, in which A and B are each a cation and X is an anion, and an emission element is located at a B site serving as a body center of the perovskite crystal structure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
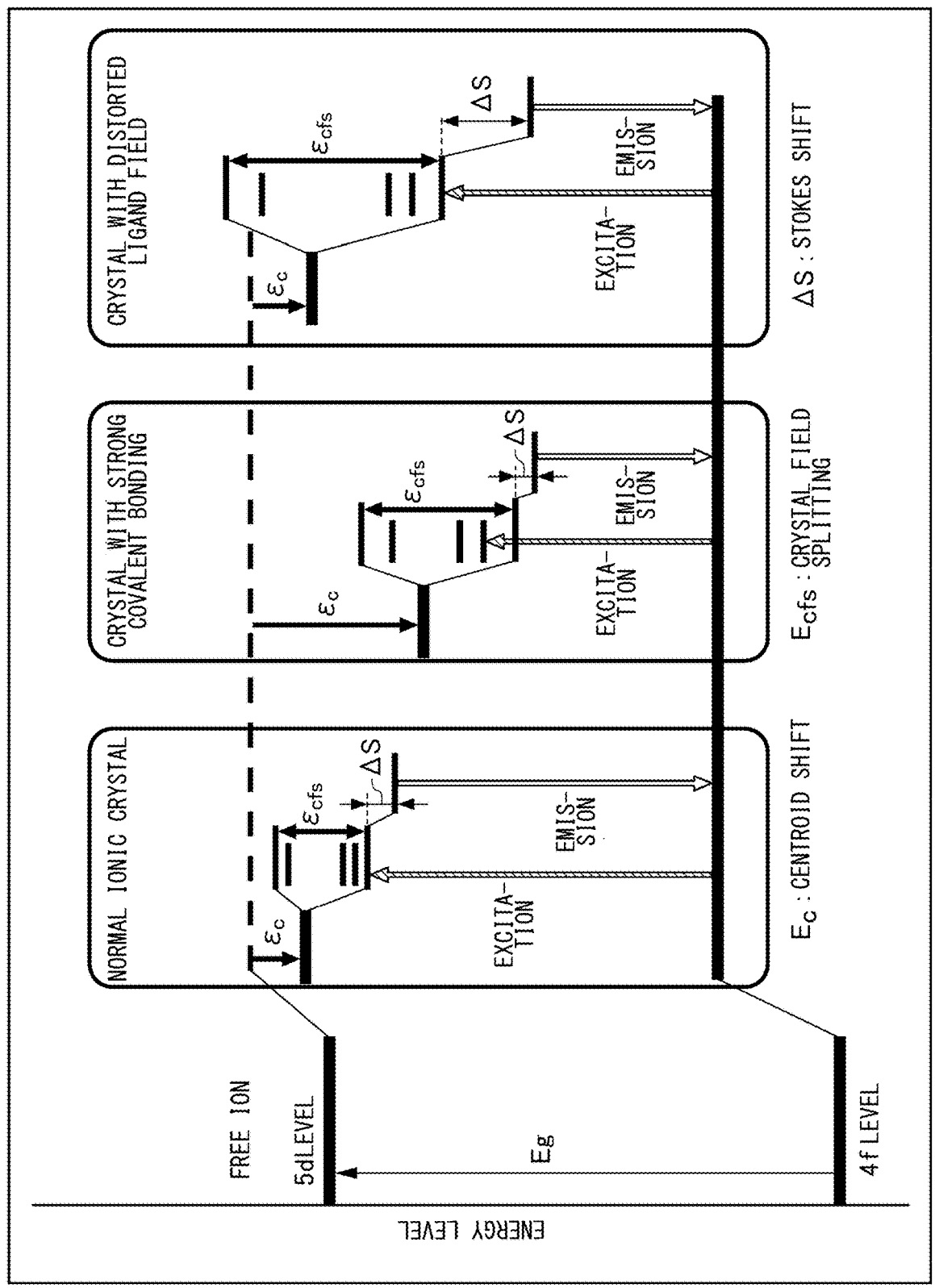
FIG. 1 is an illustration for describing a mechanism of excitation and emission corresponding to state of each crystal.

To address the foregoing issue, in a phosphor according to an aspect of the present invention, an emission site has a perovskite crystal structure expressed by $ABX_3$, in which A and B are each a cation and X is an anion, and an emission element is located at a B site serving as a body center of the perovskite crystal structure.

This aspect can achieve a novel phosphor in which the emission site has a perovskite crystal structure.

The X may include two or more types of anions. This can make an electron density in bonding of a $BX_6$ octahedron composed of a cation B and anions X non-uniform. As a result, crystal field splitting is increased, and a phosphor that emits light upon being excited by light having relatively low energy can be achieved.

The anions may include two or more elements selected from the group consisting of oxygen, halogen, and nitrogen.

The anions may include oxygen and fluorine.

The B may be one or more types of cations selected from the group consisting of $Eu^{2+}$, $Ce^{3+}$, $Sm^{2+}$ and, $Yb^{2+}$. This facilitates a 4f-5d transition.

A cation located at an A site of the perovskite crystal structure may have an ionic radius $I_A$ that is greater than an ionic radius $I_B$ of the cation located at the B site. This can provide a phosphor having a large Stokes shift.

Oxygen serving as an anion located at an X site of the perovskite crystal structure and oxygen of a $MO_4$ (M is a trivalent, tetravalent, or pentavalent metallic element) tetrahedron structure may be shared.

Any optional combinations of the above constituent elements or an embodiment obtained by converting what is expressed by the present invention among a manufacturing method, an apparatus such as a lamp or lighting, a light-emitting module, a light source, and so on is also effective as an embodiment of the present invention.

The invention will now be described by reference to the preferred embodiments. This does not intend to limit the scope of the present invention, but to exemplify the invention.

Hereinafter, the present invention will be described on the basis of exemplary embodiments with reference to the drawings. Identical or equivalent constituent elements, members, and processes illustrated in the drawings are given identical reference characters, and duplicate descriptions thereof will be omitted as appropriate. The embodiments are illustrative in nature and are not intended to limit the invention. Not all the features and combinations thereof described in the embodiments are necessarily essential to the invention.

A phosphor according to the present embodiment emits light upon being excited efficiently by ultraviolet radiation or short-wavelength visible light. Specifically, the phosphor exhibits intense excitation with near-ultraviolet light or short-wavelength visible light at no greater than 420 nm and emits red light having a peak wavelength in an emission spectrum of no less than 600 nm. The phosphor according to the present embodiment achieves red emission as a halo-oxide host crystal is doped with an activator such as a $Eu^{2+}$ ion.

The phosphor according to the present embodiment is a red phosphor having a large Stokes shift (approximately 0.8 eV to 1.2 eV). Therefore, the phosphor is less likely to absorb visible light emitted by another phosphor of blue, green, yellow, or the like. The Stokes shift is a difference between the energy at an excitation edge wavelength and the energy at a peak wavelength in an emission spectrum. The excitation edge wavelength as used herein is a wavelength in an excitation spectrum at which the excitation intensity starts to drop sharply on the longer wavelength side.

First, the circumstances leading up to the conception of the invention of the present application will be described. A phosphor for light from a semiconductor light-emitting device with a high excitation density needs a short excitation-emission cycle. With that goal, a 4f-5d allowed transition that allows for a transition with an electron spinning state being retained is suitable.

Examples of elements that allow for the 4f-5d transition include rare-earth elements, such as $Eu^{2+}$, $Ce^{3+}$, $Sm^{2+}$, or $Yb^{2+}$. The outer-shell orbital of these rare-earth elements is 6s, and the 4f orbital is in a shell inner to 6s. In the 4f-5d transition, an electron in the 4f orbital makes a transition to the 5d orbital located in a shell outer to the 4f orbital, and thus an excited state is produced. At this point, as an electron cloud in the 5d orbital spreads broader, the energy level of this orbital is reduced, and the transition probability increases.

FIG. 1 is an illustration for describing a mechanism of excitation and emission corresponding to the state of each crystal. To produce excitation with low energy, a complex emission site structure (or a structure with distorted, low symmetry) or covalent bonding is required.

For example, a 4f-5d transition with a free ion requires energy of no less than 4.0 eV. In this case, the transition is not produced with light from a semiconductor light-emitting device that emits near-ultraviolet radiation or short-wavelength visible light having a wavelength of approximately 380 nm to 450 nm. Therefore, in order to lower the 4f-5d transition energy, it is effective to dope a crystal and to allow an anion to be coordinated around a rare-earth ion. With the coordination of the anion, the 5d orbital undergoes energy reduction through two actions (centroid shift $E_c$ and crystal field splitting $E_{cfs}$).

In the centroid shift $E_c$, as a rare-earth element (cation) is coordinated by an anion, the five 5d orbitals as a whole undergo energy reduction due to an influence of surrounding negative charges. This effect is small when a coordinated anion is in ionic bonding and increases with an increase in covalent bonding.

In the case of ionic bonding, valence electrons that contribute to the bonding is distributed in an anion. An electron excited to the 5d orbital greatly repels electrically from a negatively charged anion, and the spread of the electron cloud in the 5d orbital (the decrease in the transition energy level) becomes restrictive.

In the case of covalent bonding, a valence electron that contributes to the bonding is shared by an anion and a cation. The negative charge of an anion in covalent bonding is smaller than the negative charge in ionic bonding. Therefore, the electrostatic repulsion of an electron excited to the 5d orbital is reduced, and the electron cloud in the 5d orbital spreads broadly, leading to an effective reduction in the transition energy. In other words, it can be seen that, in order to increase the centroid shift, increasing covalent bonding is important.

In the crystal field splitting $E_{cfs}$, degeneracy of the five 5d orbitals is resolved through a stereostructure in which a rare-earth element (cation) is coordinated by an anion, and the energy level (orbital level) of the 5d orbitals splits. The 5d orbital in a direction with no anion has small electrostatic repulsion against an anion, and the electron cloud in the 5d orbital spreads more easily (the energy level is reduced). Meanwhile, the electrostatic repulsion is greater in a direction with a coordinated anion, and the energy level increases. In other words, in order to greatly split the degeneracy of the 5d orbital, a distorted ligand field is required.

Figure 2:
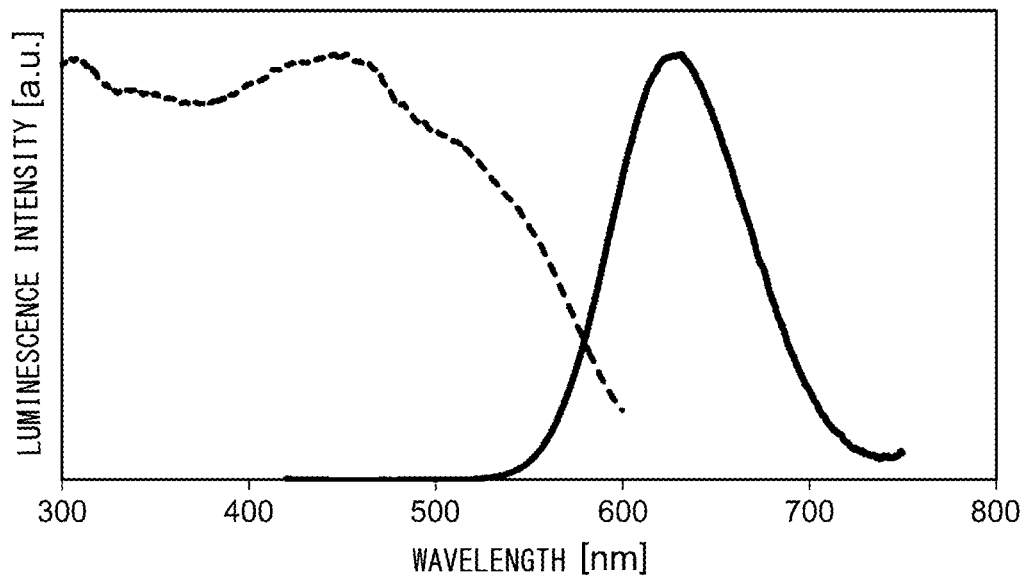
FIG. 2 illustrates an example of an excitation spectrum and an emission spectrum of a typical red phosphor with a nitride host.

FIG. 2 illustrates an example of an excitation spectrum and an emission spectrum of a typical red phosphor with a nitride host. Widely used red phosphors in recent years are phosphors with nitride hosts, such as $CaAlSiN_3$:Eu or $Ca_2Si_5N_8$:Eu. These phosphors have a large centroid shift with increased covalent bonding. Thus, as illustrated in FIG. 2, the excitation band (excitation spectrum) spreads to the longer wavelength side, and the phosphors absorb not only light in the ultraviolet range but also blue, green, and yellow visible light.

Figure 3:
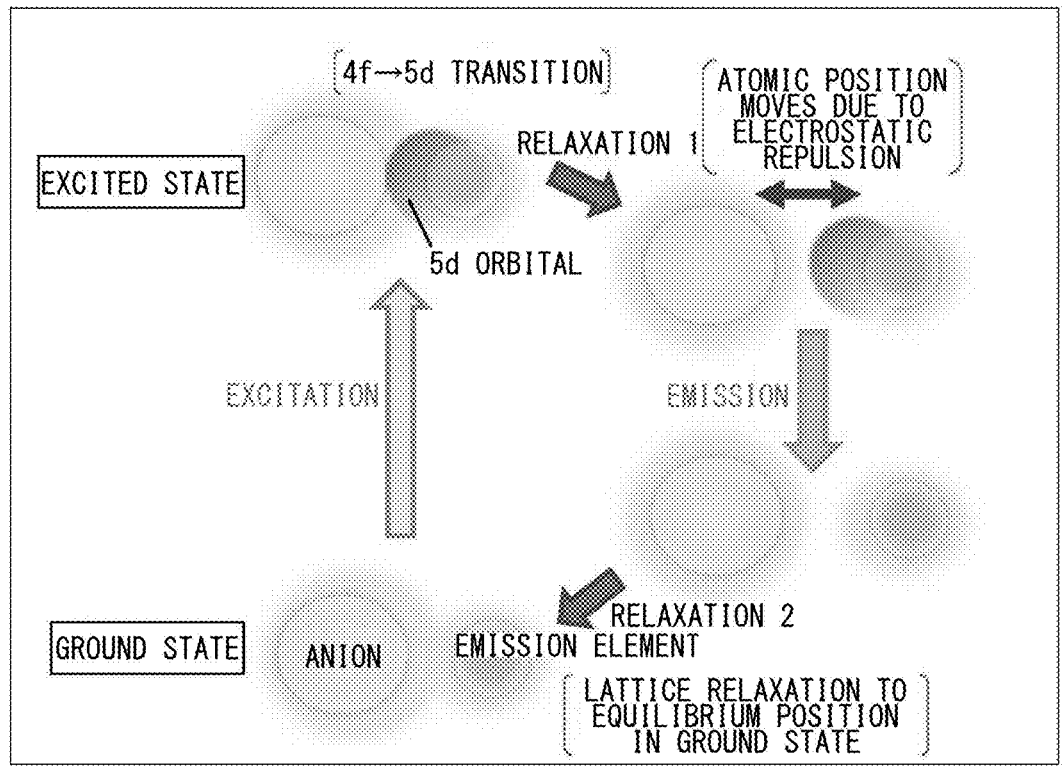
FIG. 3 is a schematic diagram for describing a Stokes shift.

FIG. 3 is a schematic diagram for describing a Stokes shift. The Stokes shift occurs as a crystal structure relaxes in an excited state. When a phosphor is excited from a ground state 4f to an excited state 5d, the excited electron orbital approaches a coordinated anion. At this point, electrostatic repulsion displaces the anion that is lighter (having smaller atomic weight) than a cation (rare-earth). However, other cations are originally present around the anion, and thus the anion only moves to an equilibrium position. Such movement of the anion makes the crystal structure in the excited state different from that in the ground state. After the change (relaxation 1) in the crystal structure in the excited state has occurred, the phosphor returns to the ground state, which produces emission.

Figure 4:
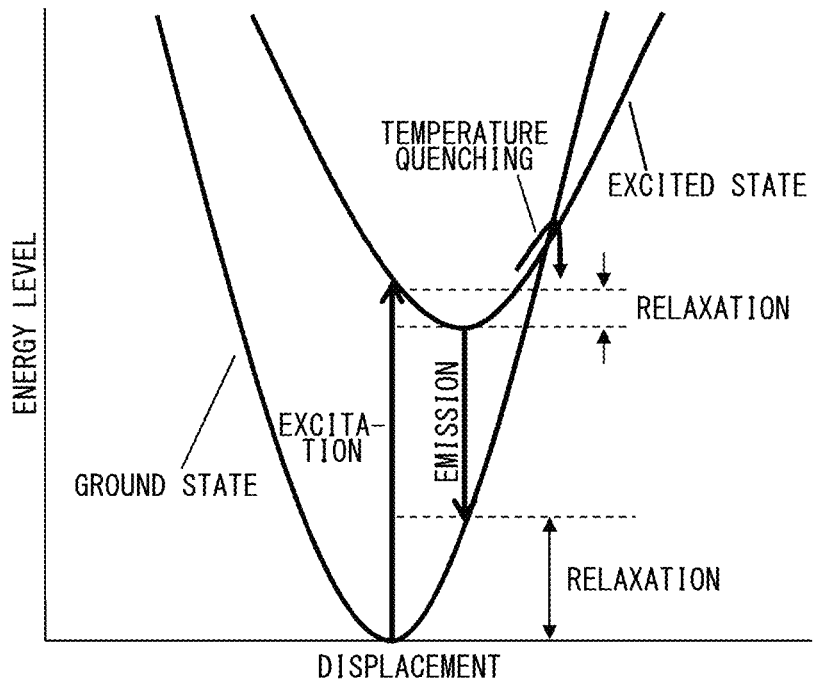
FIG. 4 is a schematic diagram illustrating configuration coordinates.

As illustrated in FIG. 3, an emission element, which is a cation, enters the excited state from the ground state upon being excited and emits light after the change (relaxation) in the crystal structure in the excited state. At this point, the energy state changes. This change is typically expressed by configuration coordinates. FIG. 4 is a schematic diagram illustrating the configuration coordinates. The vertical axis of the configuration coordinates indicates the energy level of a valence electron of the emission element, and the horizontal axis indicates the displacement of the distance between the emission element and an anion with the distance at which the energy level decreases the most in the ground state of the crystal being regarded as zero.

The energy level of a 4f electron of the emission element rises immediately upon absorbing excitation light, and the 4f electron enters the excited state. Relaxation for mitigating electrostatic repulsion against a coordinated anion occurs in the excited state, and the energy level decreases to an equilibrium state. Emission starts at that point, and thus an energy transition smaller than the excitation energy or a longer wavelength shift occurs. What needs to be taken into consideration at this point is a phonon vibration. As the displacement is greater, the phonon vibration becomes greater. In that case, the energy level of the system rises. When the temperature rises to produce a vibrational level equal to that in the ground state caused by the phonon vibration in the excited state, this results in a radiationless transition. Typically, when the Stokes shift increases, there is a concern on the decrease in the temperature characteristics.

On the basis of the findings and the discussions described above, the inventors of the present application have realized a possibility of a phosphor having a novel crystal structure that increases the Stokes shift.

Excitation/emission of a phosphor occurs through an electron orbital transition within an emission center element. Therefore, for a phosphor in a high-luminance light source, such as a white LED, an emission element (e.g., $Eu^{2+}$, $Ce^{3+}$) that makes a 4f-5d transition with a high transition speed is desirable. In excitation in a 4f-5d transition, an electron in the 4f orbital that is in a shell inner to the 6s orbital absorbs excitation energy and makes a transition to the 5d orbital that extends in a shell outer to the 6s orbital. Emission occurs as the electron returns from the 5d orbital to the 4f orbital. Therefore, in order to provide a large Stokes shift, it is important that the 5d orbital spread broadly in the excited state. The spread of the 5d orbital is determined by the crystal structure around the emission element. Accordingly, the inventors of the present application have conceived a crystal structure that increases the spread of the 5d orbital.

Figure 5:
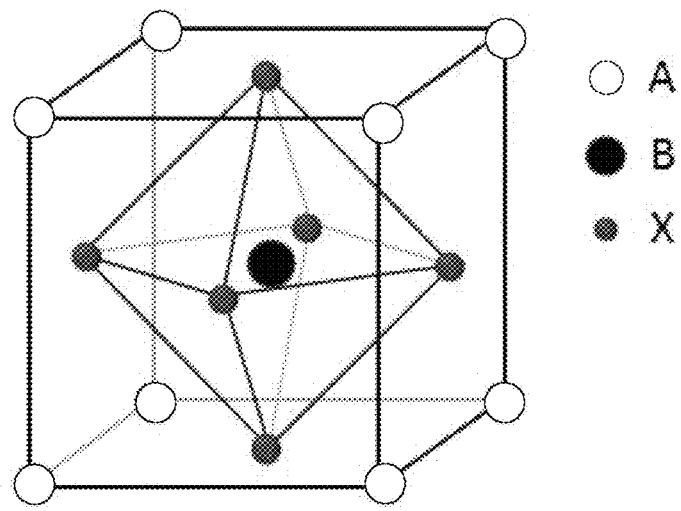
FIG. 5 illustrates a perovskite crystal structure.

First, a focus is placed on a perovskite crystal structure as one crystal structure of a phosphor according to the present embodiment. FIG. 5 illustrates a perovskite crystal structure.

A perovskite crystal expressed by a composition formula $ABX_3$ ideally has a unit cell of a cubic crystal system. A metal A is disposed at each vertex (A site) of the cubic crystal, a metal B is disposed at a body center site (B site), and an anion X is disposed at each face center site (X site) of the cubic crystal. The metal B is coordinated by six anions X to form a $BX_6$ octahedron. In an emission site according to the present embodiment, an emission element that makes a 4f-5d transition is located at the B site. In this manner, the phosphor according to the present embodiment is a novel phosphor in which the emission site has a perovskite crystal structure.

The anions X forming the $BX_6$ octahedron may include two or more types of anions. Specifically, one of the anions X is oxygen. Another type of anion X is halogen. Among halogens, fluorine is particularly preferable. In another embodiment, another type of anion X other than oxygen may be nitrogen.

The A sites according to the present embodiment are occupied by monovalent or divalent cations having a large ionic radius. The cations located at the A sites have an ionic radius $I_A$ that is greater than anionic radius $I_B$ of the emission element located at the B site. The ionic radius $I_A$ may be greater than the ionic radius $I_B$ by 10% or more. The cations occupying the A sites may be monovalent cations or divalent cations or may include both monovalent and divalent cations. The phosphor according to the present embodiment configured as described above can be excited with low energy and has a large Stokes shift.

Figure 6A:
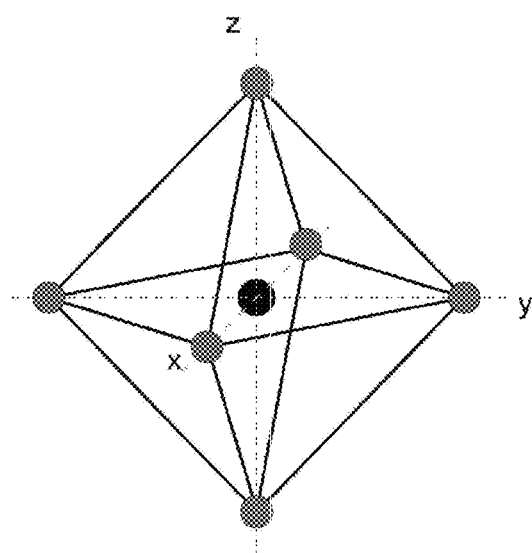
FIG. 6A schematically illustrates a six-coordination $BX_6$ octahedron.
Figure 6B:
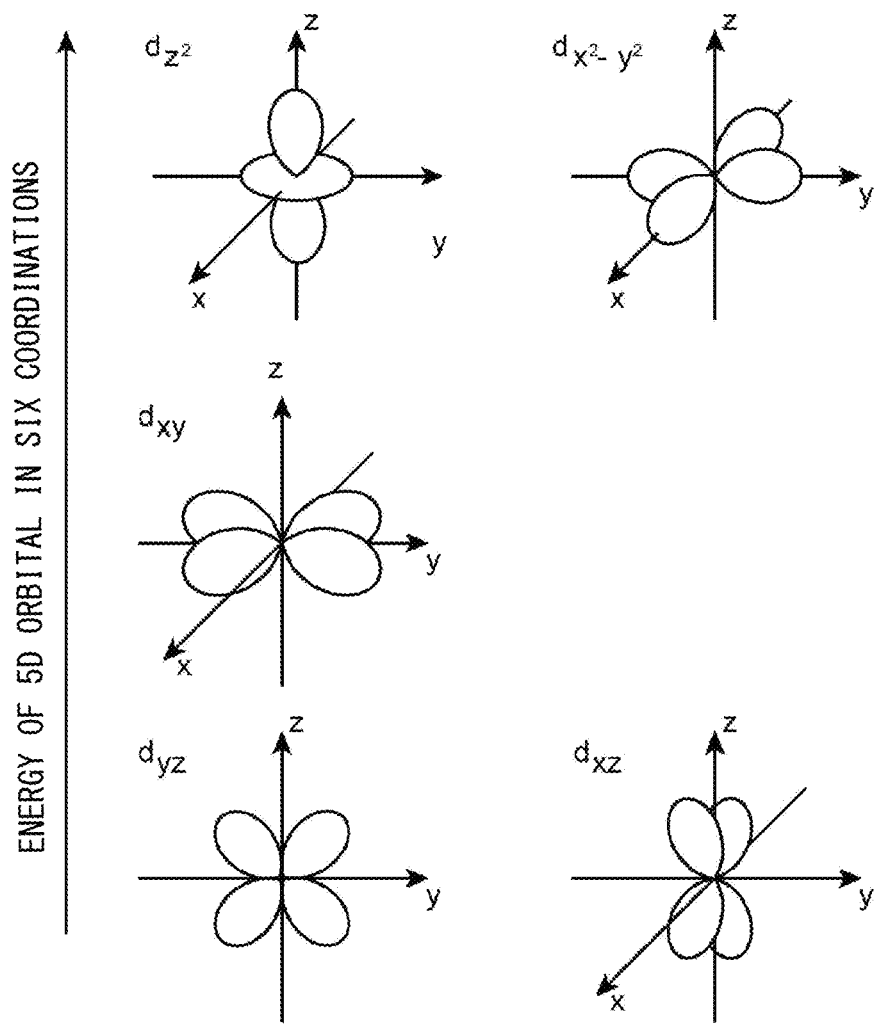
FIG. 6B is an illustration for describing energy states of a 5d orbital in the six coordinations.

FIG. 6A schematically illustrates a six-coordination $BX_6$ octahedron, and FIG. 6B is an illustration for describing the energy state of the 5d orbital in the six coordinations. In a low-energy excitation mechanism, it is preferable to have a mixed ligand (plurality of types of ligands) that reduces symmetry of the six-coordination $BX_6$ octahedron described above. A typical perovskite structure is expressed by $ABO_3$, and the B site is coordinated by six oxygen ions. Therefore, the B site exhibits strong ionic bonding, high symmetry, and little ligand field distortion. Thus, it is difficult to excite such a phosphor with small energy of light having a wavelength (380 nm to 450 nm) of a semiconductor light-emitting device used in a white LED.

Accordingly, in the phosphor according to the present embodiment, the B site in the emission site is coordinated by two or more types of anions X, and thus the electron density in the bonding of the $BX_6$ octahedron is made non-uniform. This results in an increase in the crystal field splitting and a reduction of the excitation band to the energy level that is excited by emission (low energy) from a semiconductor light-emitting device used in a white LED. The degeneracy of the 5d orbital at this point spreads so as to avoid electrostatic repulsion against an anion present in the axial direction, and thus the energy level of the $t_{2g}$ orbital is reduced more than the energy level of the $e_g$ orbital. In the $t_{2g}$ orbital, the energy level in $d_{xz}$ and $d_{yz}$ directions in which the density of the anions X is low decreases.

Figure 7:
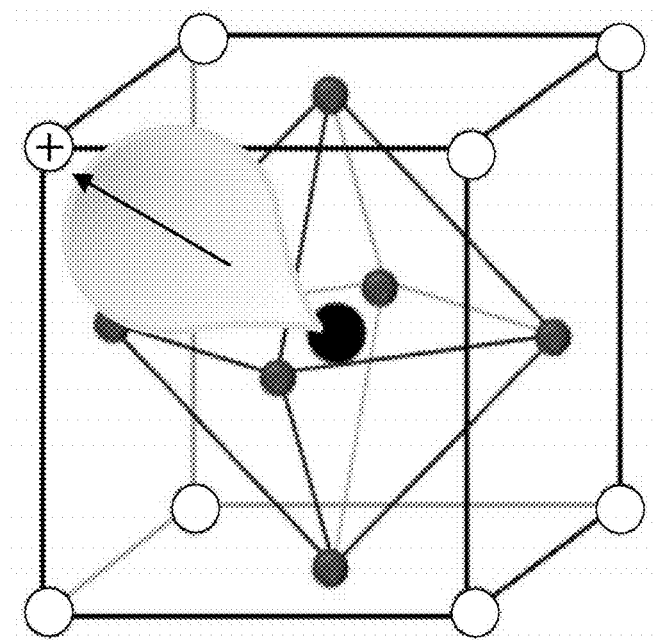
FIG. 7 schematically illustrates a spread of a split orbital.

FIG. 7 schematically illustrates a spread of a split orbital. As illustrated in FIG. 7, the split $d_{xz}$ and $d_{yz}$ orbitals spread toward the A sites that are located at the respective vertices of the cubic crystal. The cations at the A sites are positively charged. Electrons in the $d_{xz}$ and $d_{yz}$ orbitals that have spread from the B site are attracted to the A sites (since the cations at the A sites have a large ionic radius and large mass, these cations are not pulled by the electrostatic attraction).

Since the electron cloud in the $d_{xz}$ and $d_{yz}$ orbitals spreads broadly due to electrostatic attraction, the energy level of the $d_{xz}$ and $d_{yz}$ orbitals decreases in the excited state. Accordingly, the Stokes shift increases. In normal relaxation in an excited state, the coordination positions of the anions change due to electrostatic repulsion between an 5d electron and an anion, and the relaxation thus occurs conceivably as the structure of the ligand field greatly changes. In contrast, in the crystal structure of this conception, the 5d orbital is broadened by electrostatic attraction between a 5d electron and a cation, and thus a change in the structure of the ligand field is small. This is because the atomic weight of the cation is large and the cation is heavy, making the cation less mobile. Thus, the phosphor according to the present embodiment exhibits stable temperature characteristics notwithstanding a large Stokes shift.

A light-emitting module including a first phosphor (e.g., a red phosphor) according to the present embodiment, a second phosphor (e.g., a blue phosphor, a green phosphor, a yellow phosphor, an orange phosphor, etc.) that emits fluorescence in a color different from that of the first phosphor, and a semiconductor light-emitting device that emits light for exciting the first phosphor and the second phosphor provides the following advantageous effects.

First, the first phosphor according to the present embodiment absorbs almost no light in a wavelength range longer than an emission wavelength of the semiconductor light-emitting device, and thus a color mismatch is less likely to occur when the first phosphor is combined with the second phosphor of a different emission color. Second, the first phosphor according to the present embodiment does not induce relaxation of the excited state caused by movement of an anion. Thus, a change in the crystal structure caused by excitation is small, and good temperature characteristics can be obtained notwithstanding a large Stokes shift.

Example 1

In a phosphor according to Example 1, elements constituting a crystal structure $ABX_3$ of an emission site are $K^+$ for cations A, $Eu^{2+}$ for a cation B, and $O^{2-}$ and $F^-$ for anions X. $Ce^{3+}$, $Sm^{2+}$, $Yb^{2+}$, or the like may be added, aside from $Eu^{2+}$, as the cation B. This configuration facilitates a 4f-5d transition. A cation M constituting a tetrahedron $MO_4$ connecting perovskite structures of the emission site is $P^{5+}$. M may be a trivalent, tetravalent, or pentavalent metallic element.

The phosphor according to Example 1 was manufactured through the following method. First, KF and $K_2CO_3$ powders were dried for two hours at 150° C. Then, KF, $K_2CO_3$, $CaHPO_4$, $(NH_3)_2HPO_4$, and $Eu_2O_3$ were precisely measured in a glove box filled with dry $N_2$ to achieve a stoichiometric ratio of 1.000:0.500:0.990:0.010:0.0050 (mol), and this was crushed and mixed in an alumina mortar to obtain a starting powder mixture. This starting powder mixture was placed in an alumina crucible and baked for six hours at 1000° C. to obtain a baked powder. Baking was carried out under a mixed gas atmosphere of $N_2/H_2$=95/5. The obtained baked powder was then washed with pure water to obtain the phosphor according to Example 1.

[X-Ray Diffraction Pattern]

Figure 8:
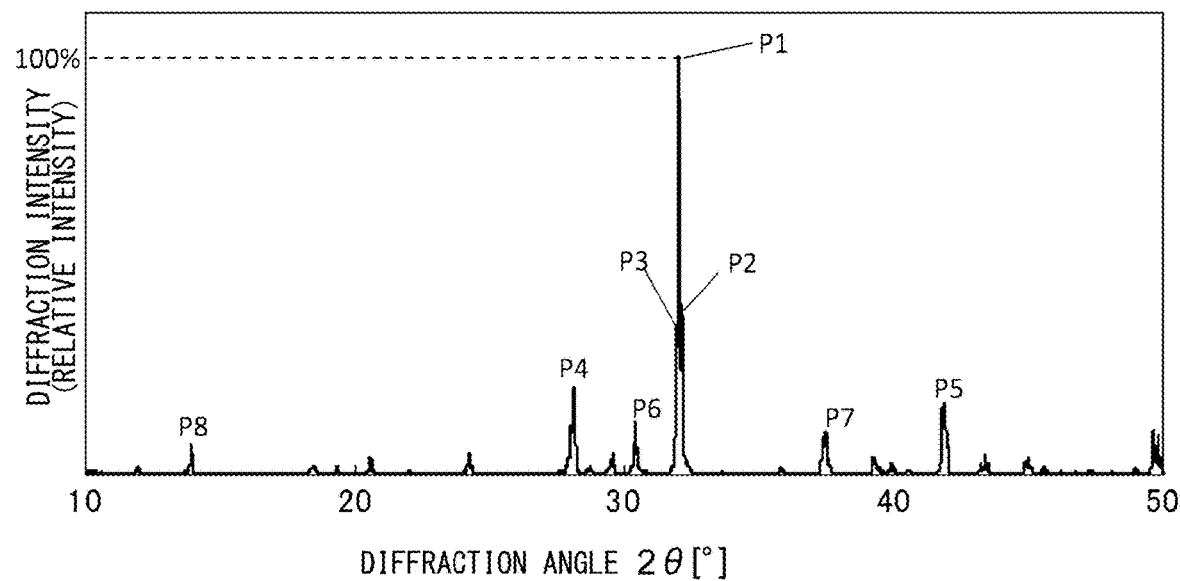
FIG. 8 illustrates an X-ray diffraction pattern of a phosphor according to Example 1.

Next, X-ray diffractometry will be described. First, X-ray powder diffractometry was carried out with an X-ray powder diffractometer (RINT Ultima III: manufactured by Rigaku Corporation) with the use of an X-ray tube emitting Cu Kα radiation and under the condition where the sampling width was 0.01° and the scan speed was 0.05°/min. FIG. 8 illustrates an X-ray diffraction pattern of the phosphor according to Example 1.

As illustrated in FIG. 8, in the X-ray diffraction pattern in which Cu-Kα characteristic X-ray is used, at least a portion of a crystal included in the phosphor according to Example 1 has a first diffraction peak P1, a second diffraction peak P2, and a third diffraction peak P3 that are within a range in which a diffraction angle 2θ is from 31.0° to 33.0°. When the diffraction intensity of the first diffraction peak P1 having a maximum intensity is regarded as 100, the diffraction intensities of the second diffraction peak P2 and the third diffraction peak P3 are from 30 to 50. A fourth diffraction peak P4 having a diffraction intensity of 15 to 25 is present in a range in which the diffraction angle 2θ is from 27.0° to 29.0°. A fifth diffraction peak P5 having a diffraction intensity of 15 to 25 is present in a range in which the diffraction angle 2θ is from 41.0° to 43.0°. A sixth diffraction peak P6 having a diffraction intensity of 10 to 15 is present in a range in which the diffraction angle 2θ is from 29.0° to 31.0°. A seventh diffraction peak P7 having a diffraction intensity of 10 to 15 is present in a range in which the diffraction angle 2θ is from 36.0° to 39.0°. An eighth diffraction peak P8 having a diffraction intensity of 5 to 10 is present in a range in which the diffraction angle 2θ is from 13.0° to 15.0°.

For the powder sample of the phosphor according to Example 1, the crystal system, the Bravais lattice, the space group, and the lattice constant of the phosphor according to the present embodiment were determined as follows with the use of data processing software (Rapid Auto from Rigaku Corporation) on the basis of the X-ray diffraction pattern obtained through the above measurement.
crystal system: monoclinic
Bravais lattice: simple lattice
space group: P2$_1$/m
lattice constant:
a=7.3161 (4) Å
b=5.8560(6) Å
c=12.6434 (1) Å
α=γ=90°
β=90.3200°
V=541.673782 Å$^3$ Thereafter, the atomic coordinates were determined with the use of crystal structure analyzing software. The result of this analysis revealed that the foregoing crystal had a novel structure that was not registered in the International Center for Diffraction Data (ICDD), which is an X-ray diffraction database widely used in X-ray diffractometry.

The phosphor of Example 1 includes oxygen and fluorine as anions. Oxygen and fluorine are elements that are side-by-side on the periodic table, and it is difficult to identify their occupying positions solely from X-ray diffraction data.

Therefore, in order to grasp the occupying position of F, a sample according to Example 1 was subjected to solid NMR measurement. In solid NMR, the bonding state of elements having a spin quantum number of ½ can be grasped, and the bonding relationship of $^{19}$F and $^{31}$P can be investigated. The measurement was carried out with the use of JNM-ECZ500R (manufactured by JEOL Ltd.) with a magnetic field intensity of 11.7 T (500 MHz). A measurement probe of 3.2 mm was stuffed with a sample in approximately 50 μL, and the measurement was carried out at a room temperature (approximately 23° C.).

Figure 9:
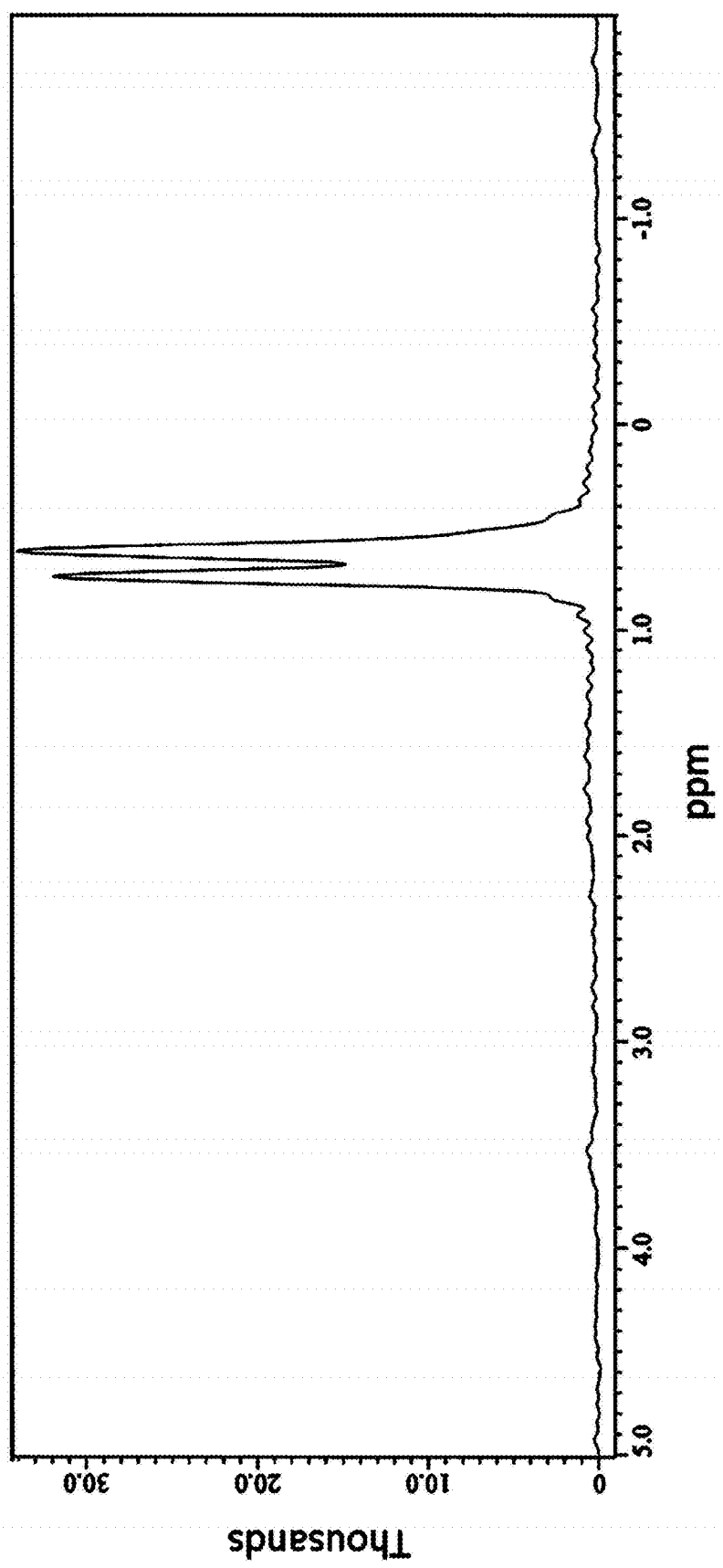
FIG. 9 illustrates a result of a resonance spectrum measured without decoupling.
Figure 10:
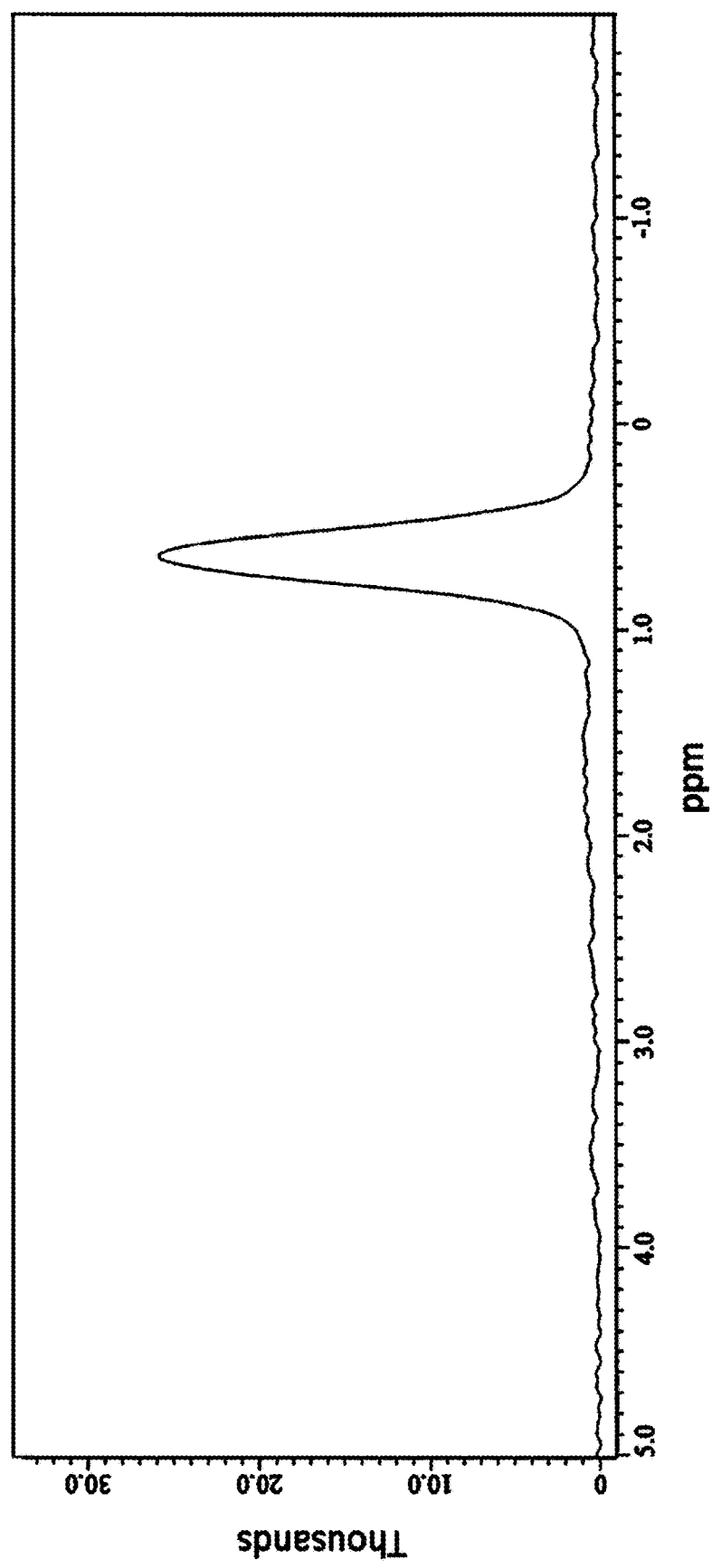
FIG. 10 illustrates a result of a resonance spectrum from decoupling measurement with a P-F interaction removed.

First, Dipolar Decoupling-Magic Angle Spinning (DD-MAS) measurement of $^{31}$P was carried out. FIG. 9 illustrates a result of a resonance spectrum measured without decoupling. As illustrated in FIG. 9, a resonance spectrum was observed at 0.64 ppm and 0.76 ppm. Then, the sample was irradiated with a radio wave (470.6 MHz) corresponding to the magnetogyric ratio of $^{19}$F, and decoupling measurement was carried out with a P-F interaction removed. FIG. 10 illustrates a result of a resonance spectrum from the decoupling measurement with the P-F interaction removed. As illustrated in FIG. 10, the resonance spectrum has changed to a single broad signal. This result indicated that F provided some kind of interference with atomic vibration of P, but the determination on the presence of coupling was not reached.

Figure 11:
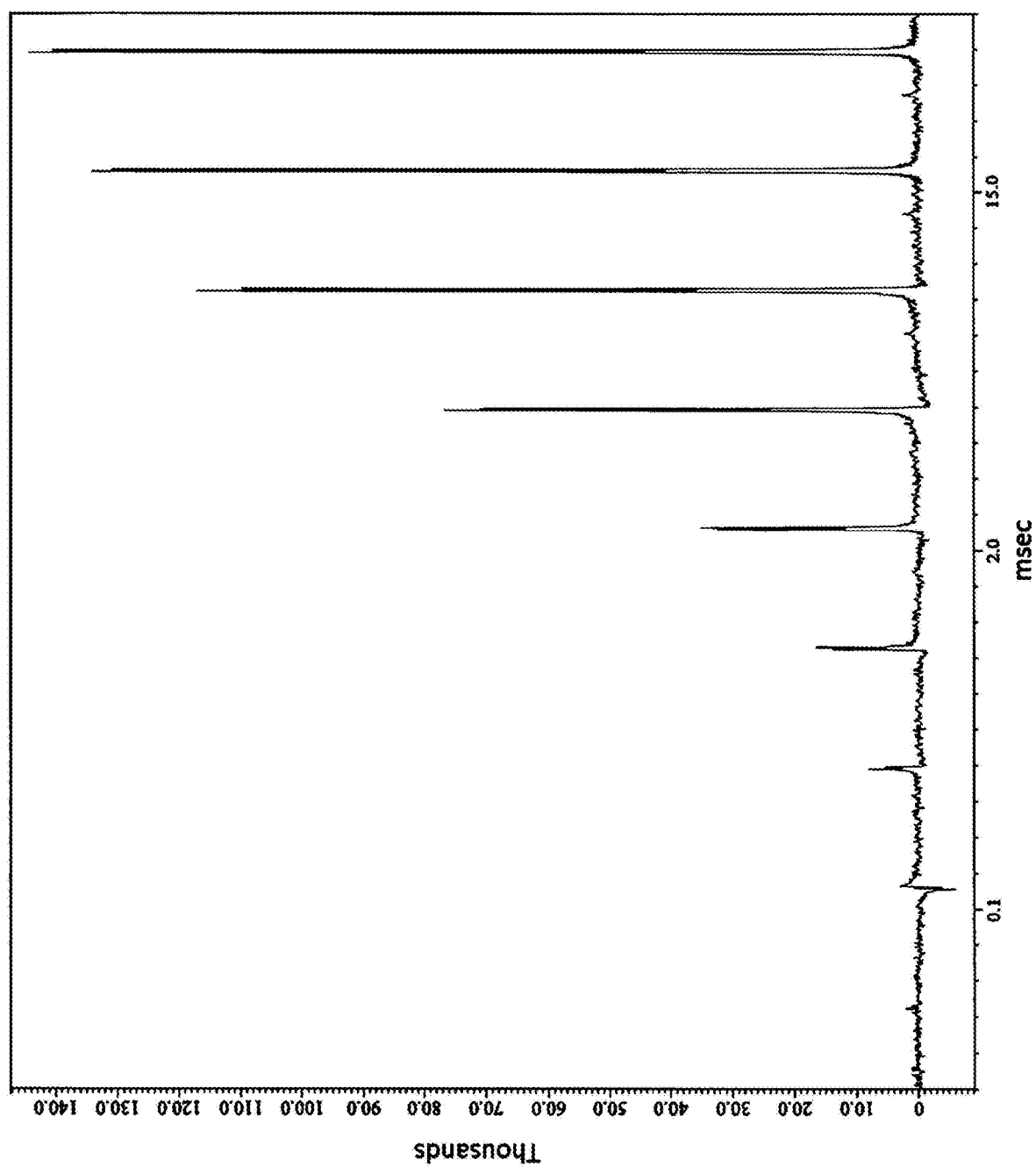
FIG. 11 illustrates a result of $^{31}P\{^{19}F\}$CP-CPMAS measurement.

Next, $^{31}$P{$^{19}$F}CP-Cross Polarization-Magic Angle Spinning (CPMAS) measurement was carried out. The measurement was carried out with a varied contact duration of 50 μs to 20000 μs. FIG. 11 illustrates a result of the $^{31}$P{$^{19}$F}CP-CPMAS measurement. As illustrated in FIG. 11, a maximum value of the signal intensity did not appear even when the contact duration was extended up to 20000 μs, and the signal intensity increased monotonically with an increase in the contact duration. This revealed that fluorine was in the vicinity of phosphorus but fluorine and phosphorus were not in direct coupling.

Phosphorus tends to have a tetragonal coordination structure. From the result of the solid NMR described above, it was determined that phosphorus was coordinated by four oxygens. Thus, in the structure analysis carried out on the basis of the X-ray diffraction data of Example 1, the structure analysis was carried out with an assumption that phosphorus was present within a crystal in the form of (PO$_4$)$^{3-}$.

The relationship between each element and the atomic coordinates is shown in Table 1.

TABLE 1

|  | x | Y | z |
|---|---|---|---|
| Ca 01 | 0.80199 | 0.75000 | 0.07630 |
| Eu 01 | 0.80199 | 0.75000 | 0.07630 |
| Ca 02 | 0.70720 | 0.75000 | 0.56512 |
| Eu 02 | 0.70720 | 0.75000 | 0.56512 |
| K 03 | 0.78425 | 0.25000 | 0.41989 |
| K 04 | 0.70332 | 0.25000 | 0.93312 |
| K 05 | 0.51539 | 0.25000 | 0.68663 |
| K 06 | 0.97756 | 0.75000 | 0.81193 |
| P 07 | 0.99058 | 0.25000 | 0.66057 |
| P 08 | 0.48832 | 0.75000 | 0.83670 |
| F 09 | 0.00000 | 0.50000 | 0.00000 |
| F 10 | 0.50000 | 0.00000 | 0.50000 |
| O 13 | 0.65718 | 0.75000 | 0.90970 |
| O 14 | 0.99976 | 0.75000 | 0.21783 |
| O 15 | 0.88731 | 0.03479 | 0.62419 |
| O 16 | 0.37493 | 0.53512 | 0.85990 |
| O17 | 0.54455 | 0.75000 | 0.72003 |
| O 18 | 0.81841 | 0.75000 | 0.38966 |

Figure 12:
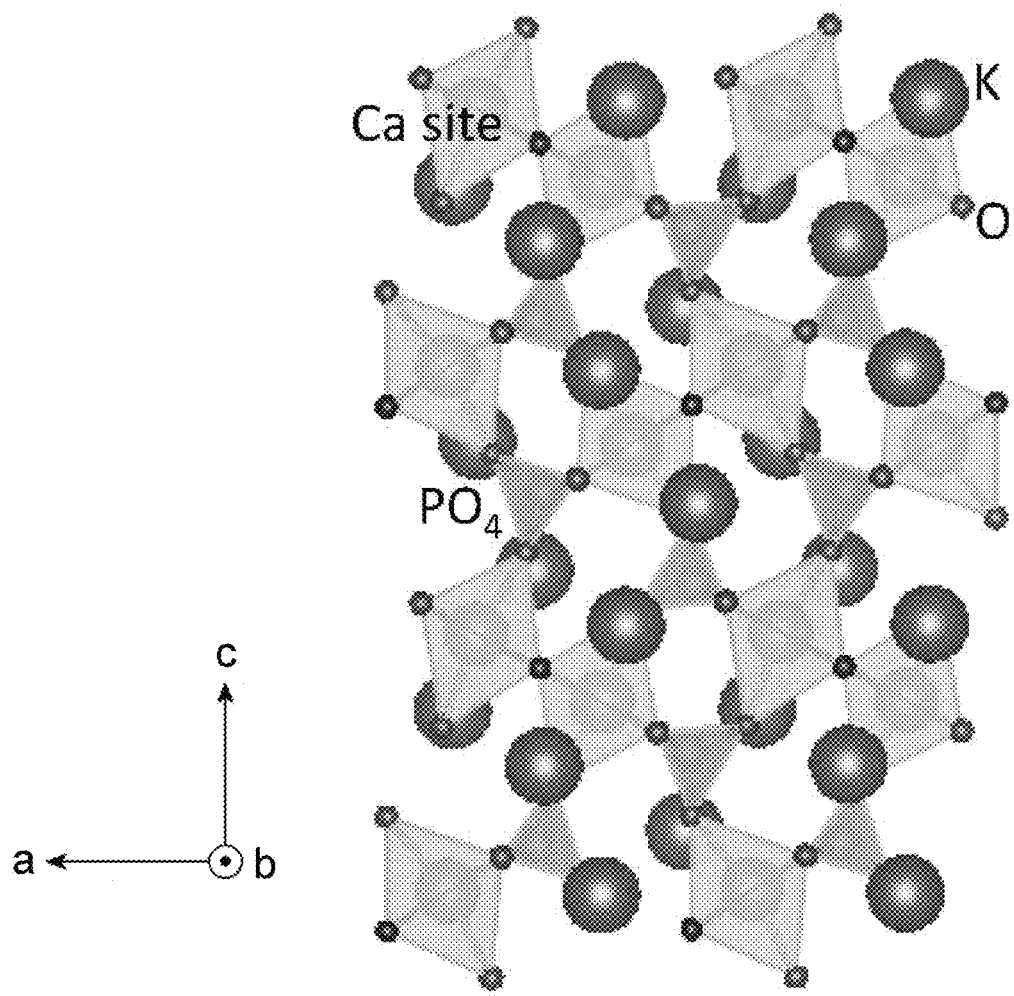
FIG. 12 is a schematic diagram illustrating a crystal structure of a phosphor according to an embodiment.

The result of the crystal structure analysis is illustrated in FIG. 12. FIG. 12 is a schematic diagram illustrating a crystal structure of the phosphor according to the present embodiment. The occupying position of the emission element Eu$^{2+}$ is a Ca site (see Table 1). The crystal structure illustrated in FIG. 12 is an illustration as viewed in the b-axis direction.

Figure 13:
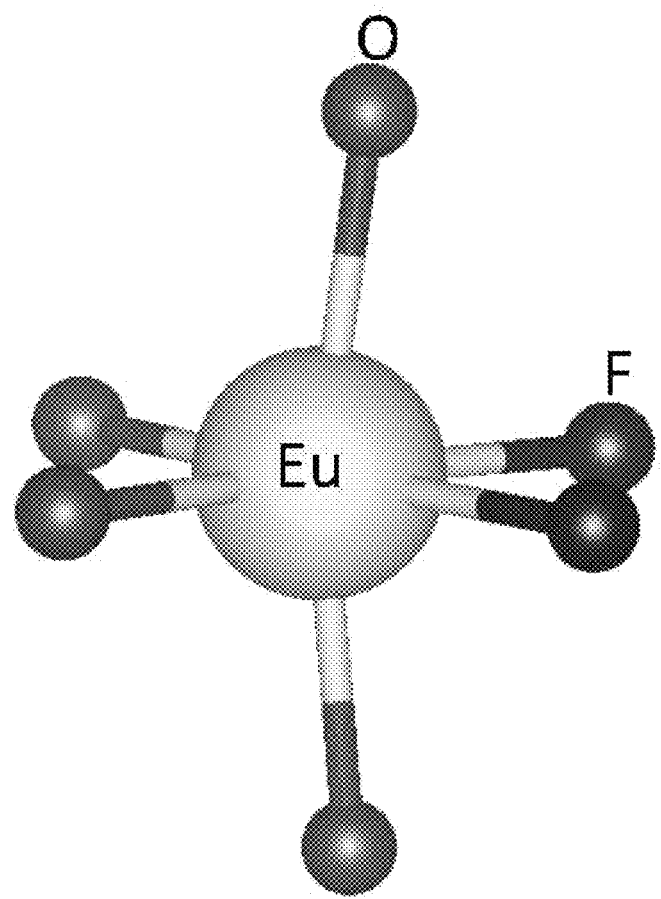
FIG. 13 is an illustration for describing a crystal structure of an emission site.

FIG. 13 is an illustration for describing a crystal structure of the emission site. The Eu$^{2+}$ site has an octahedron structure coordinated by six anions. The anions include four oxygen ions and two fluorine ions. The structure of the octahedron EuO$_4$F$_2$ is a cis-type structure in which the two fluorine ions are located adjacent to each other.

The fluorine ions in the octahedron EuO$_4$F$_2$ are arrayed linearly in the b-axis direction of this crystal to connect octahedrons EuO$_4$F$_2$ by sharing vertices of the octahedrons EuO$_4$F$_2$. As a result, the octahedrons EuO$_4$F$_2$ are connected in a zigzag manner in the b-axis direction with the fluorine ions at the centers (see FIG. 14). Each oxygen ion of the octahedron EuO$_4$F$_2$ shares a vertex with a PO$_4$ tetrahedron.

Figure 14:
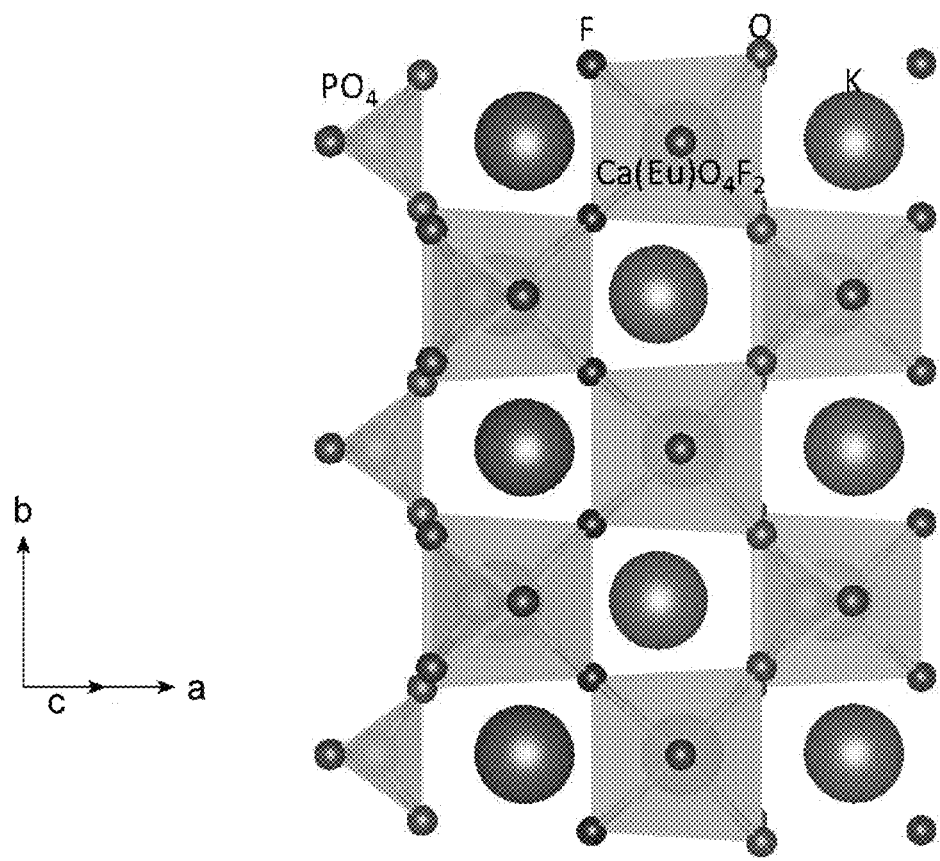
FIG. 14 is a schematic diagram illustrating the crystal structure of the phosphor illustrated in FIG. 12 as viewed in another direction.

FIG. 14 is a schematic diagram illustrating the crystal structure of the phosphor illustrated in FIG. 12 as viewed in another direction. As illustrated in FIG. 14, when the crystal is viewed in a direction in which the c-axis is rotated by 30° about the b-axis, the octahedrons EuO$_4$F$_2$ are arranged in a houndstooth check pattern due to the fluorine ions and the PO$_4$ tetrahedrons. Potassium ions are so arranged as to fill the gaps in the houndstooth check of the octahedrons EuO$_4$F$_2$. When an attention is paid to the relationship between the potassium ions and the octahedrons EuO$_4$F$_2$, this relationship has a perovskite structure expressed by the composition formula ABX$_3$.

Figure 15:
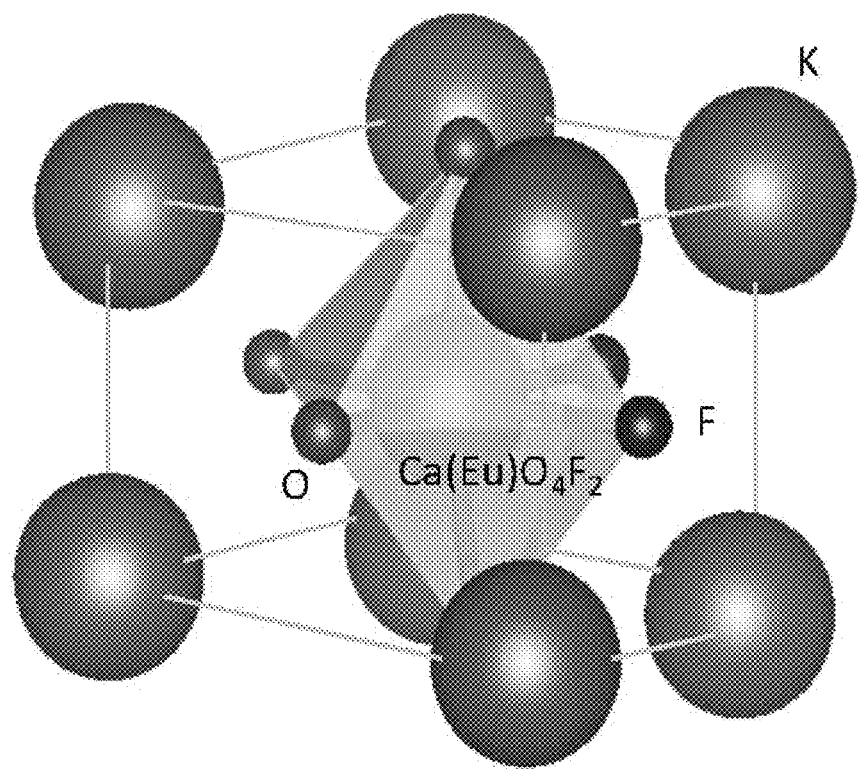
FIG. 15 illustrates an emission site of a perovskite crystal structure according to an embodiment.

FIG. 15 illustrates an emission site of the perovskite crystal structure according to the present embodiment. As illustrated in FIG. 15, eight potassium ions are located at the vertices of a cubic lattice (A sites). Oxygen ions and fluorine ions serving as the anions of the octahedron EuO$_4$F$_2$ are located on the face centers of the cubic lattice formed by the potassium. A europium (or calcium) ion is located at the body center of the cubic lattice (B site). The potassium ions (K$^+$) occupying the A sites have an ionic radius of 1.51 Å, and this ionic radius is greater by 29% than an ionic radius 1.17 Å of the europium ion (Eu$^{2+}$) occupying the B site.

The electron density of the cis-type octahedron EuO$_4$F$_2$ with a divalent europium ion at the center becomes skewed toward fluorine with higher electronegativity. Therefore, the symmetry of the electron distribution in the octahedron is lost, and thus the degeneracy of the 5d orbital of the divalent europium ion is resolved. As a result, a valence electron in the 4f orbital of an inner shell of divalent europium more easily makes a transition to the $d_{xz}$ or $d_{yz}$ orbital of the 5d orbital even with low energy. The direction of the $d_{xz}$ or $d_{yz}$ orbital is in the direction of a vertex of the cubic lattice constituting the perovskite structure. This position is occupied by a cation $K^+$ having a large ionic radius. This results in electrostatic attraction between the electron cloud of 5d electrons ($d_{xz}$ or $d_{yz}$ orbital) of $Eu^{2+}$ and the cation $K^+$. At this point, since a $K^+$ ion has large mass and is less mobile, the spread of the electron cloud in the $d_{xz}$ or $d_{yz}$ orbital increases. As a result, the probability that an electron is present in the $d_{xz}$ or $d_{yz}$ orbital increases, and the energy level decreases, resulting in a large Stokes shift.

[Unit Cell]

Figure 16:
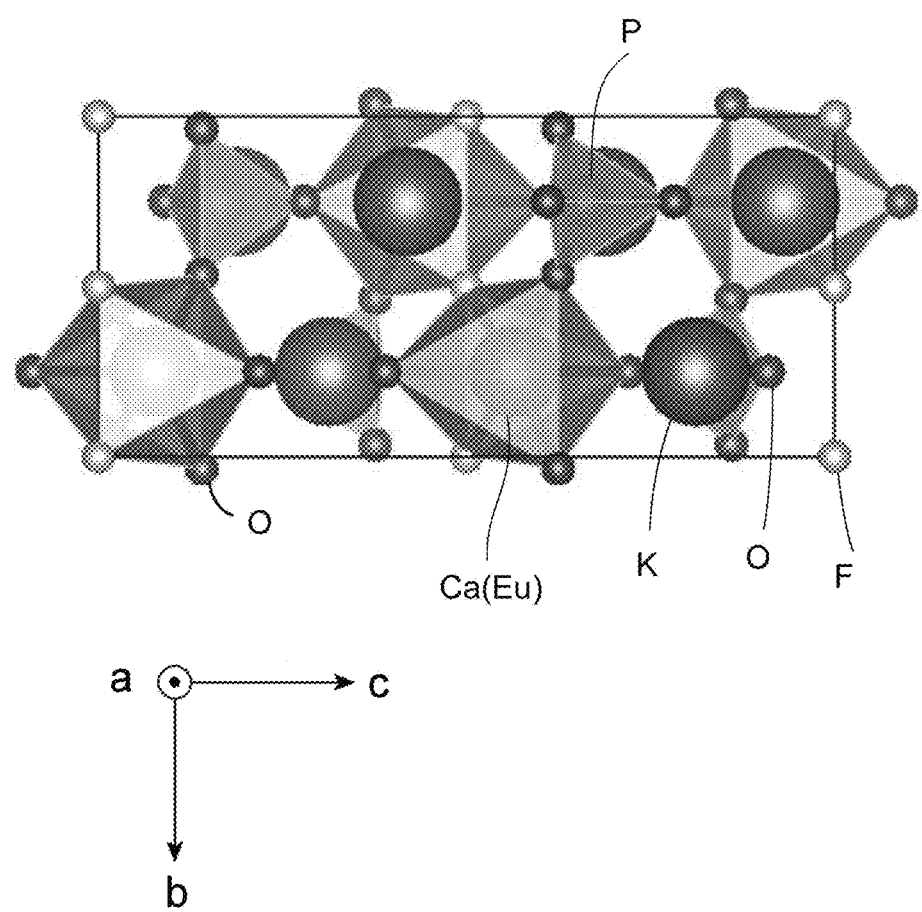
FIG. 16 is a schematic diagram of a unit cell of a phosphor according to an embodiment as viewed in an a-axis direction.
Figure 17:
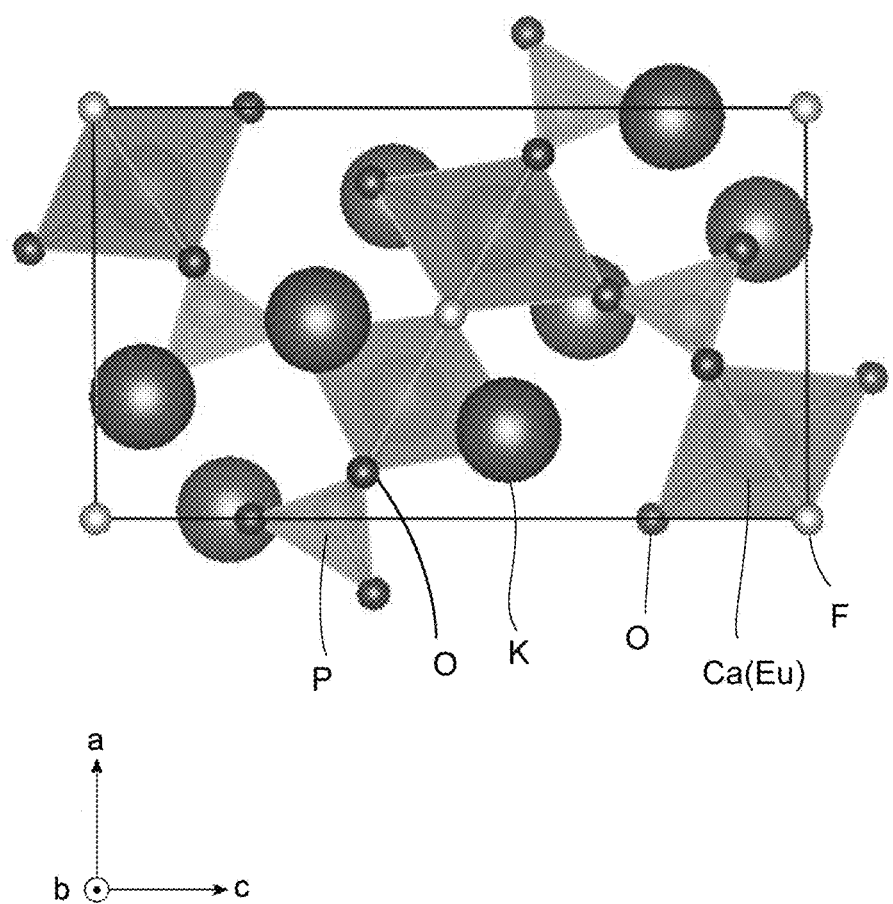
FIG. 17 is a schematic diagram of a unit cell of a phosphor according to an embodiment as viewed in a b-axis direction.
Figure 18:
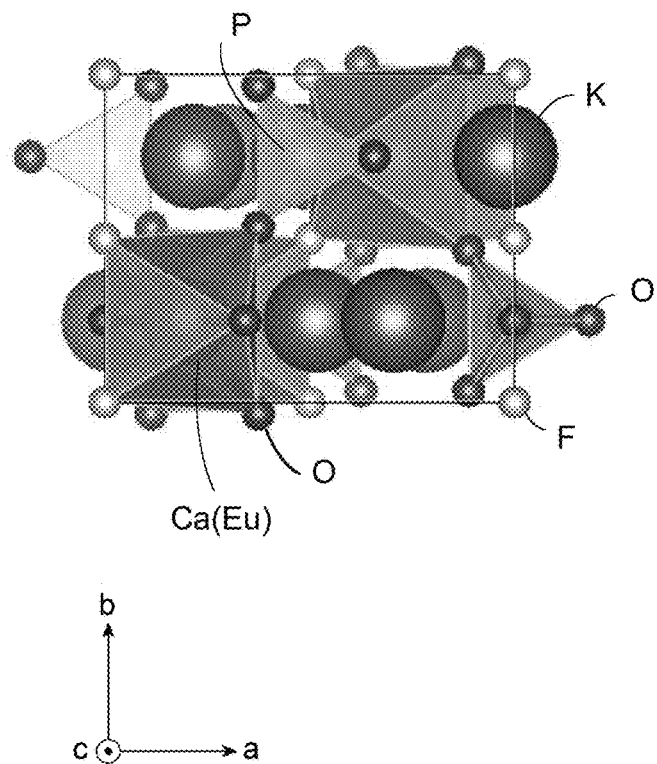
FIG. 18 is a schematic diagram of a unit cell of a phosphor according to an embodiment as viewed in a c-axis direction.

A unit cell of the crystal structure illustrated in FIGS. 12, 14, and so on is illustrated below. FIG. 16 is a schematic diagram of a unit cell of the phosphor according to the present embodiment as viewed in the a-axis direction. FIG. 17 is a schematic diagram of the unit cell of the phosphor according to the present embodiment as viewed in the b-axis direction. FIG. 18 is a schematic diagram of the unit cell of the phosphor according to the present embodiment as viewed in the c-axis direction. The unit cell includes the atoms on the coordinates shown in Table 1. The a-axis corresponds to the coordinates (x,0,0), the b-axis corresponds to (0,y,0), and the c-axis corresponds to (0,0,z).

[Excitation Spectrum and Emission Spectrum]

Figure 19:
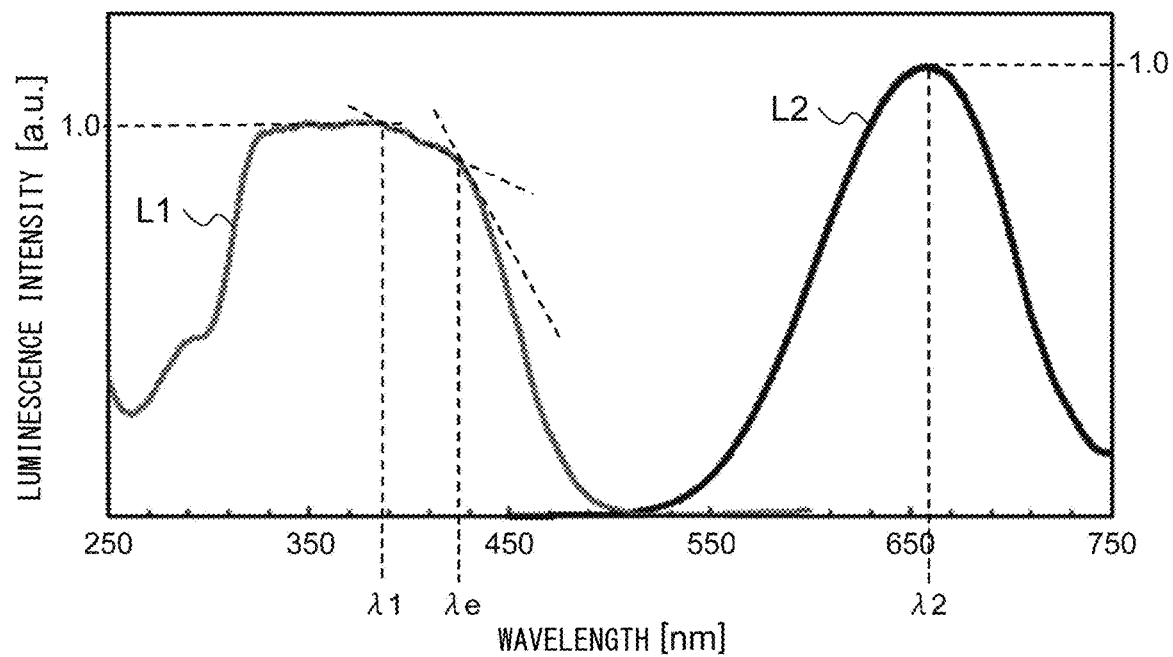
FIG. 19 illustrates an excitation spectrum and an emission spectrum of a phosphor according to Example 1.

FIG. 19 illustrates an excitation spectrum and an emission spectrum of the phosphor according to Example 1. The excitation spectrum and the emission spectrum were measured at a room temperature with the use of a multi-channel optical spectrometer (PMA C5966-31 manufactured by Hamamatsu Photonics K.K.). The emission spectrum was measured with excitation at 400 nm. The excitation spectrum was measured with the monitoring wavelength set to the emission peak wavelength of excitation at 400 nm.

As illustrated in FIG. 19, an excitation spectrum L1 of the phosphor according to Example 1 has a peak wavelength $\lambda 1$ in a range of 330 nm to 420 nm, or more specifically, in a range of 350 nm to 390 nm. An excitation edge wavelength $\lambda e$ is approximately 420 nm, and the energy at that wavelength is 2.938 eV. Meanwhile, an emission spectrum L2 has a peak wavelength $\lambda 2$ of 658 nm and a full width at half height of 152 nm, and the energy at the peak wavelength $\lambda 2$ is 1.884 eV. Accordingly, the Stokes shift is 1.054 eV. The chromaticity coordinates (cx,cy) of the light emitted by this phosphor are (0.613,0.384).

The powder sample obtained in Example 1 was embedded in a transparent resin, and this was polished so that the measurement surface becomes flat. Then, the composition was analyzed with the use of an EPMA (manufactured by JEOL Ltd.). The result revealed that the phosphor according to Example 1 had a composition ratio of $KF \cdot Ca_{0.99}KPO_4 : Eu^{2+}_{0.01}$.

Figure 20:
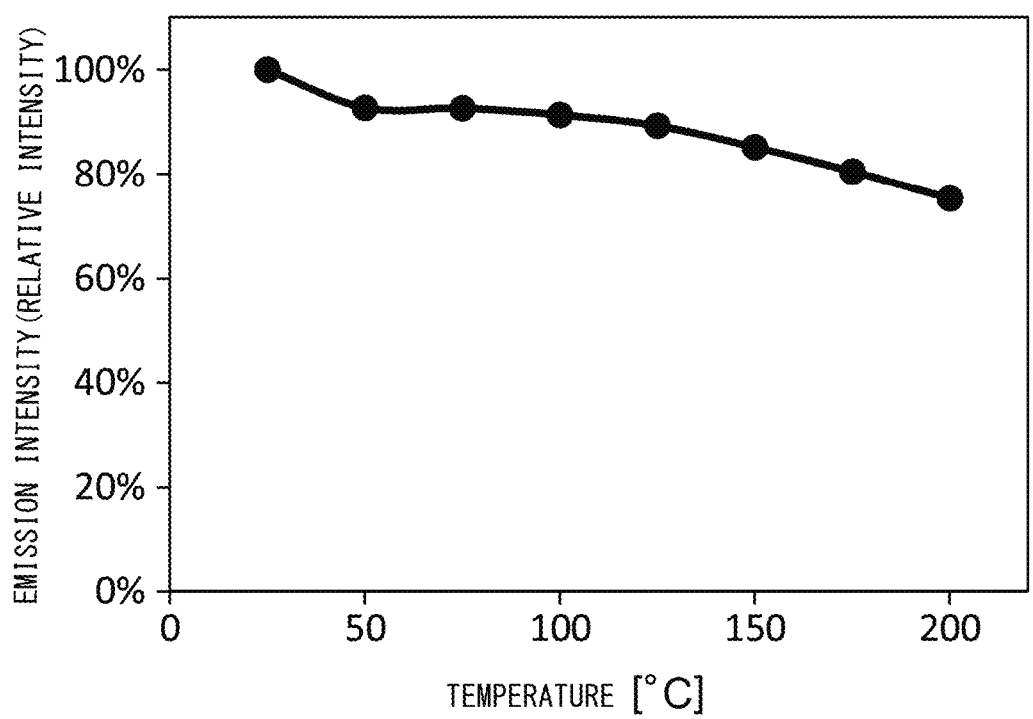
FIG. 20 illustrates temperature characteristics of emission of the phosphor according to Example 1.

FIG. 20 illustrates temperature characteristics of emission of the phosphor according to Example 1. FIG. 20 illustrates a relative intensity at each temperature normalized with the emission intensity at 30° C. obtained upon being excited by light having a wavelength of 400 nm being regarded as 100%. The retention rate of the emission intensity at 150° C. was no less than 90% relative to that at 30° C., and good temperature characteristics were observed notwithstanding a large Stokes shift.

[Emission by Short Wavelength Excitation]

The inventors of the present application have found that the emission color of the emission site of the perovskite structure of Example 1 shifts to bluish green when the emission site is excited by high energy (short wavelength).

As described above, the anions for the emission center Eu of the phosphor according to Example 1 have a cis-type octahedron structure of $EuO_4F_2$. In other words, the anions are located in the respective crystallographic axis directions (see FIG. 6A). For example, when the phosphor according to Example 1 is excited by low energy of approximately 3.10 eV (400 nm), the energy level of the $t_{2g}$ orbital caused by the crystal field splitting of the 5d orbital decreases, and the 5d orbital spreads in this direction.

Figure 21:
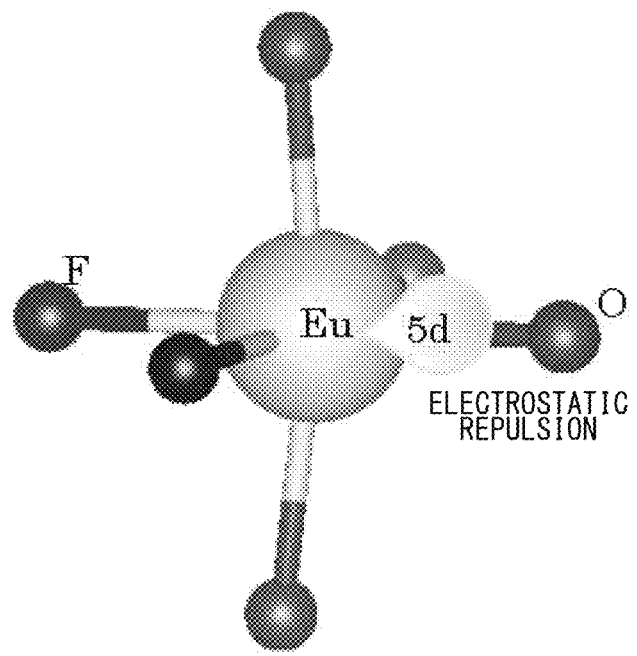
FIG. 21 is a schematic diagram illustrating a spread of an electron cloud in an octahedron $EuO_4F_2$.
Figure 22:
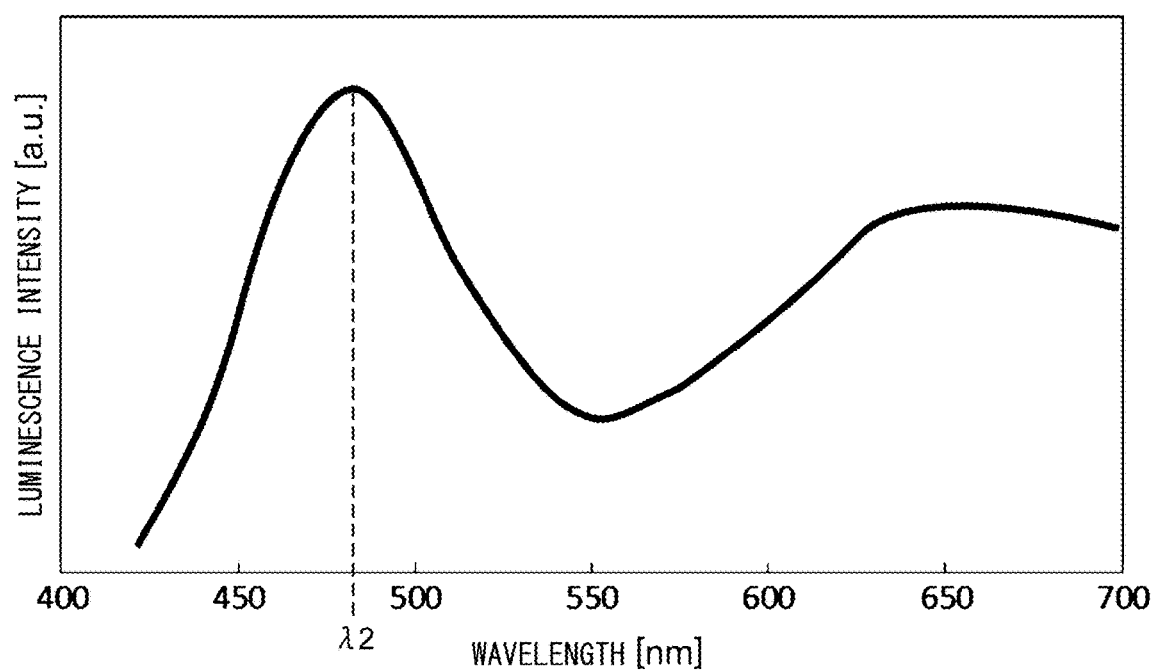
FIG. 22 illustrates an emission spectrum obtained when the phosphor according to Example 1 is irradiated with high-energy ultraviolet radiation.

Meanwhile, when the phosphor is excited by high energy of 4.13 eV (300 nm), the electron cloud of the 5d orbital spreads in an orbital $e_g$ with a high energy level caused by the crystal field splitting of the 5d orbital, that is, in an axial direction in which an anion is present. FIG. 21 is a schematic diagram illustrating the spread of the electron cloud in the octahedron $EuO_4F_2$. The electrostatic attraction of the cations at the vertex positions of the perovskite cube does not act on the 5d orbital that has spread in an axial direction. Instead, the electrostatic repulsion (repulsive force) against an anion in the axial direction acts. Therefore, the spread of the 5d orbital is suppressed, and the emission shifts toward the shorter wavelength side. FIG. 22 illustrates an emission spectrum obtained when the phosphor according to Example 1 is irradiated with high-energy ultraviolet radiation. As illustrated in FIG. 22, bluish green emission with a peak wavelength $\lambda 2$ in the emission spectrum of 476 nm was observed with the phosphor according to Example 1.

Figure 23:
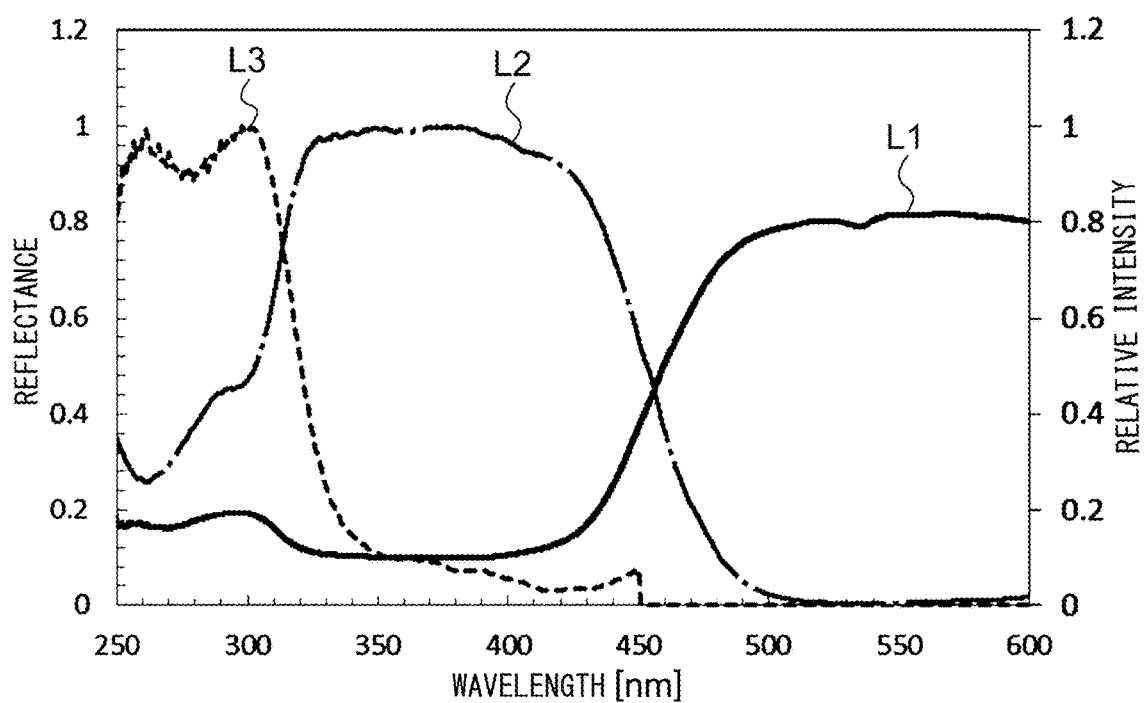
FIG. 23 illustrates a diffuse reflection spectrum of the phosphor according to Example 1.

Next, as evidence indicating that one emission element emits light in two colors, a diffuse reflection spectrum of the phosphor according to Example 1 was measured. FIG. 23 illustrates a diffuse reflection spectrum of the phosphor according to Example 1. As indicated by a line L1 in FIG. 23, it can be seen that most light at 420 nm or shorter is absorbed. On this diffuse reflection spectrum, an excitation spectrum L2 for red emission (monitoring wavelength of 622 nm) and an excitation spectrum L3 for bluish green emission (monitoring wavelength of 476 nm) are superimposed. From the above, it can be confirmed that the excitation band for the red emission is in a range of 330 nm to 420 nm, and the excitation band for the bluish green emission is near 250 nm to 320 nm. This indicates that the emission color of one emission center changes according to the difference in the excitation wavelength.

In this manner, the phosphor according to the present embodiment emits red light by light at a first wavelength (e.g., near-ultraviolet radiation or short-wavelength visible light having a peak wavelength of 380 nm to 450 nm) and emits light in a color on a shorter wavelength side of the red light (e.g., blue to green having a wavelength of 450 nm to 550 nm) by light at a second wavelength (e.g., near-ultraviolet radiation with a wavelength of 200 nm to 350 nm) that is shorter than the first wavelength.

Example 2

In a phosphor according to Example 2, elements constituting a crystal structure $ABX_3$ of an emission site are $K^+$ (0.997) and $Na^+$ (0.003) for cations A, $Eu^{2+}$ for a cation B, and $O^{2-}$ and $F^-$ for anions X. A cation M constituting a tetrahedron $MO_4$ connecting perovskite structures of the emission site is $P^{5+}$.

The phosphor according to Example 2 was manufactured through the following method. First, KF, NaF, and $K_2CO_3$ powders were dried for two hours at 150° C. Then, KF, $K_2CO_3$, NaF, $CaHPO_4$, $(NH_3)_2HPO_4$, and $Eu_2O_3$ were precisely measured in a glove box filled with dry $N_2$ to achieve a stoichiometric ratio of 0.994:0.500:0.006:0.960:0.040: 0.020 (mol), and this was crushed and mixed in an alumina mortar to obtain a starting powder mixture. Processes similar to those in Example 1 were carried out thereafter to obtain the phosphor according to Example 2. The composition of the powder sample obtained in Example 2 was analyzed in a method similar to that in Example 1. The result revealed that the phosphor according to Example 2 had a composition ratio of $(K_{0.994},Na_{0.006})F \cdot Ca_{0.96}KPO_4:Eu^{2+}_{0.04}$.

Figure 24:
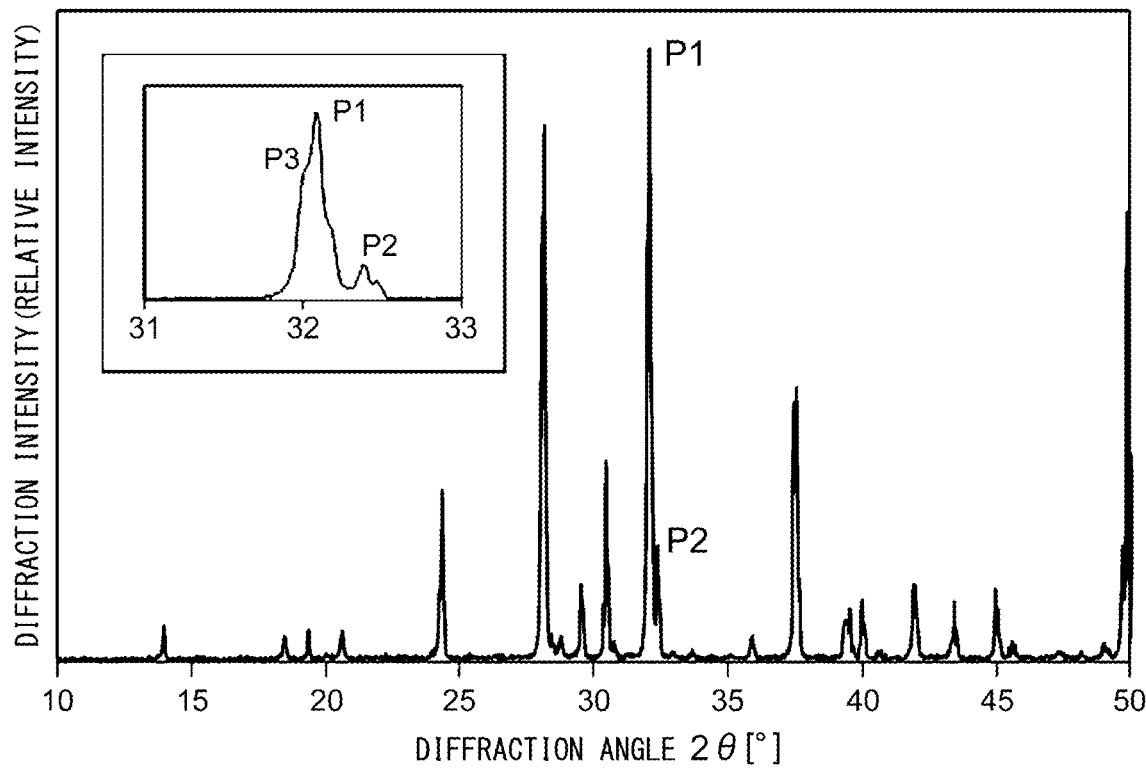
FIG. 24 illustrates an X-ray diffraction pattern of a phosphor according to Example 2.

FIG. 24 illustrates an X-ray diffraction pattern of the phosphor according to Example 2. The measurement was carried out at a sampling width of 0.02° and at a scan speed of 2.0°/min. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.51 Å that takes the occupancy of potassium and sodium occupying the A sites into consideration is greater by 29% than anionic radius 1.17 Å of $Eu^{2+}$ occupying the B site.

Figure 25:
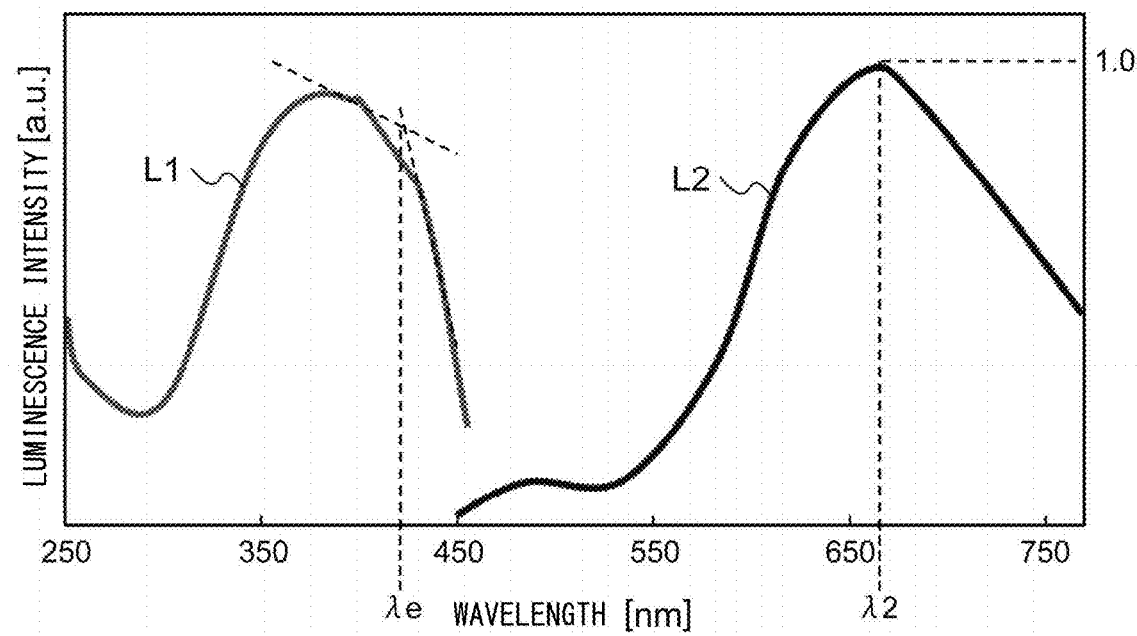
FIG. 25 illustrates an excitation spectrum and an emission spectrum of the phosphor according to Example 2.

FIG. 25 illustrates an excitation spectrum and an emission spectrum of the phosphor according to Example 2. The excitation spectrum and the emission spectrum were measured in a method similar to that in Example 1.

As illustrated in FIG. 25, the excitation spectrum L1 of the phosphor according to Example 2 has a peak wavelength λ1 in a range of 330 nm to 420 nm, or more specifically, in a range of 350 nm to 390 nm. The wavelength λe at the excitation edge is approximately 425 nm, and the energy at that wavelength is 2.917 eV. Meanwhile, the emission spectrum L2 has a peak wavelength λ2 of 658 nm, and the energy at the peak wavelength λ2 is 1.884 eV. Accordingly, the Stokes shift is 1.033 eV. The chromaticity coordinates (cx,cy) of the light emitted by this phosphor are (0.553, 0.377).

Example 3

In a phosphor according to Example 3, elements constituting a crystal structure $ABX_3$ of an emission site are $K^+$ (0.997) and $Rb^+$ (0.003) for cations A, $Eu^{2+}$ for a cation B, and $O^{2-}$ and $F^-$ for anions X. A cation M constituting a tetrahedron $MO_4$ connecting perovskite structures of the emission site is $P^{5+}$.

The phosphor according to Example 3 was manufactured through the following method. First, KF, RbF, and $K_2CO_3$ powders were dried for two hours at 150° C. Then, KF, $K_2CO_3$, RbF, $CaHPO_4$, $(NH_3)_2HPO_4$, and $Eu_2O_3$ were precisely measured in a glove box filled with dry $N_2$ to achieve a stoichiometric ratio of 0.994:0.600:0.005:0.960:0.040: 0.020 (mol), and this was crushed and mixed in an alumina mortar to obtain a starting powder mixture. Processes similar to those in Example 1 were carried out thereafter to obtain the phosphor according to Example 3. The composition of the powder sample obtained in Example 3 was analyzed in a method similar to that in Example 1. The result revealed that the phosphor according to Example 3 had a composition ratio of $(K_{0.994},Rb_{0.006})F \cdot Ca_{0.96}KPO_4:Eu^{2+}_{0.04}$.

Figure 26:
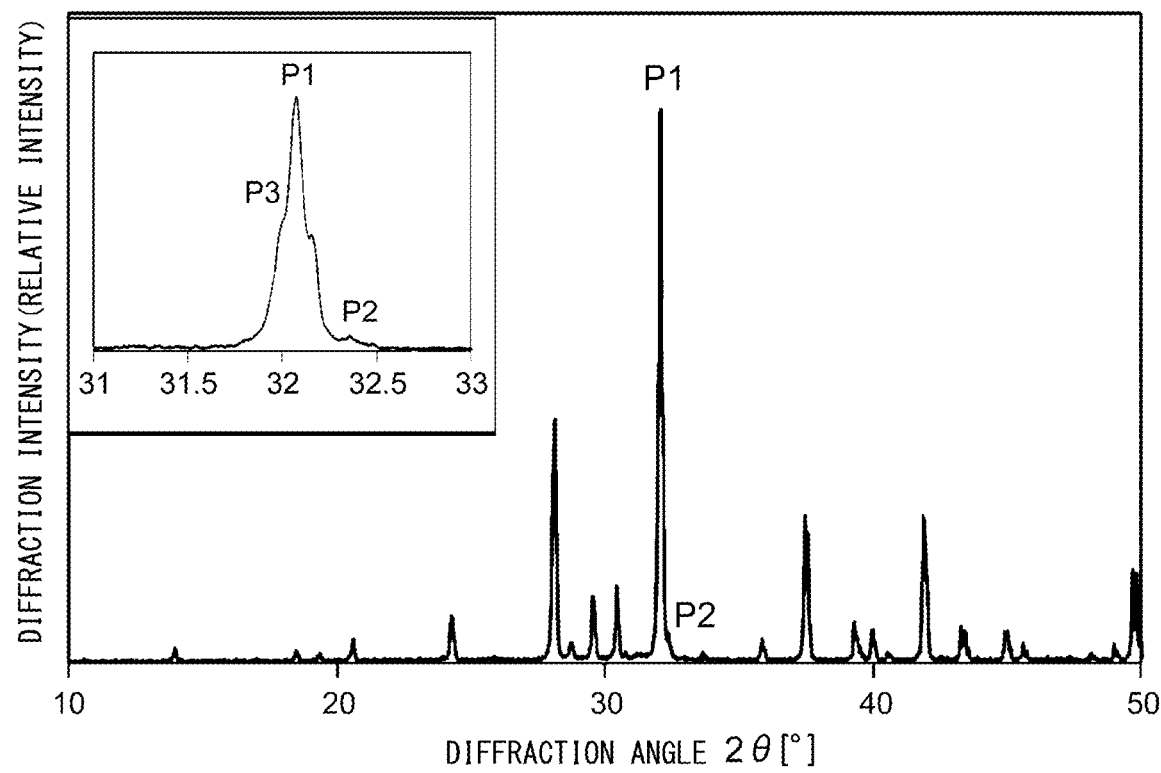
FIG. 26 illustrates an X-ray diffraction pattern of a phosphor according to Example 3.

FIG. 26 illustrates an X-ray diffraction pattern of the phosphor according to Example 3. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.51 Å that takes the occupancy of potassium and rubidium occupying the A sites into consideration is greater by 29% than an ionic radius 1.17 Å of $Eu^{2+}$ occupying the B site.

Figure 27:
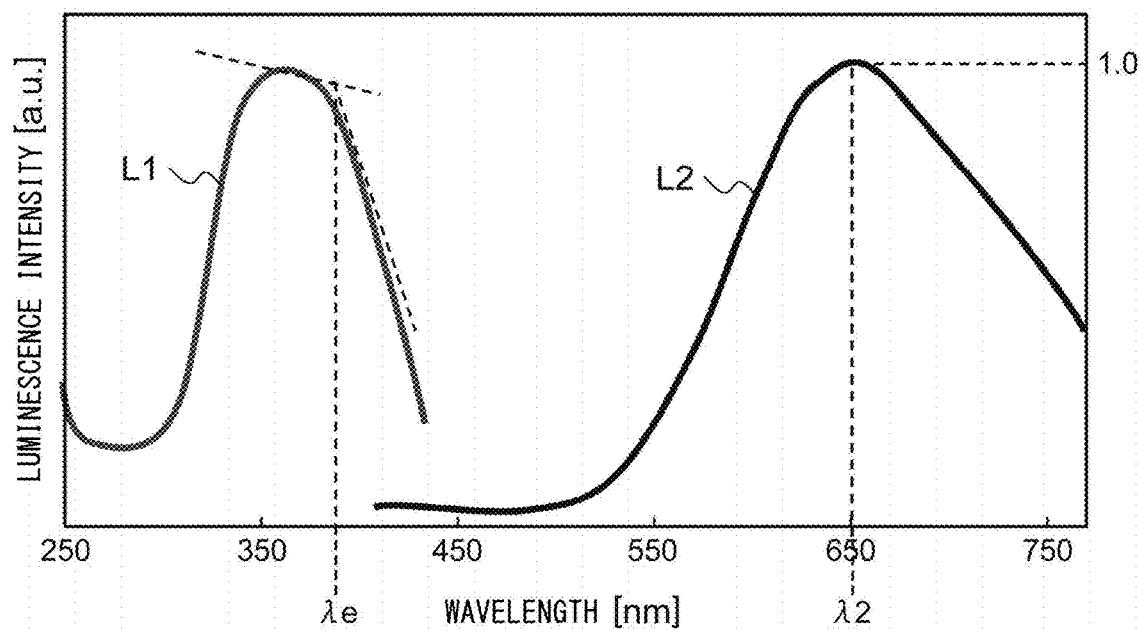
FIG. 27 illustrates an excitation spectrum and an emission spectrum of the phosphor according to Example 3.

FIG. 27 illustrates an excitation spectrum and an emission spectrum of the phosphor according to Example 3. The excitation spectrum and the emission spectrum were measured in a method similar to that in Example 1.

As illustrated in FIG. 27, the excitation spectrum L1 of the phosphor according to Example 3 has a peak wavelength λ1 in a range of 330 nm to 420 nm, or more specifically, in a range of 350 nm to 390 nm. The wavelength λe at the excitation edge is approximately 395 nm, and the energy at that wavelength is 3.139 eV. Meanwhile, the emission spectrum L2 has a peak wavelength λ2 of 654 nm, and the energy at the peak wavelength λ2 is 1.896 eV. Accordingly, the Stokes shift is 1.243 eV. The chromaticity coordinates (cx,cy) of the light emitted by this phosphor are (0.583, 0.391).

Example 4

In a phosphor according to Example 4, elements constituting a crystal structure $ABX_3$ of an emission site are $K^+$ (0.95) and $Li^+$ (0.05) for cations A, $Eu^{2+}$ for a cation B, and $O^{2-}$ and $F^-$ for anions X. A cation M constituting a tetrahedron $MO_4$ connecting perovskite structures of the emission site is $P^{5+}$.

The phosphor according to Example 4 was manufactured through the following method. First, KF, LiF, and $K_2CO_3$ powders were dried for two hours at 150° C. Then, KF, $K_2CO_3$, LiF, $CaHPO_4$, $(NH_3)_2HPO_4$, and $Eu_2O_3$ were precisely measured in a glove box filled with dry $N_2$ to achieve a stoichiometric ratio of 0.90:0.500:0.10:0.960:0.040:0.020 (mol), and this was crushed and mixed in an alumina mortar to obtain a starting powder mixture. Processes similar to those in Example 1 were carried out thereafter to obtain the phosphor according to Example 4. The composition of the powder sample obtained in Example 4 was analyzed in a method similar to that in Example 1. The result revealed that the phosphor according to Example 4 had a composition ratio of $(K_{0.90},Li_{0.10})F \cdot Ca_{0.96}KPO_4:Eu^{2+}_{0.04}$.

Figure 28:
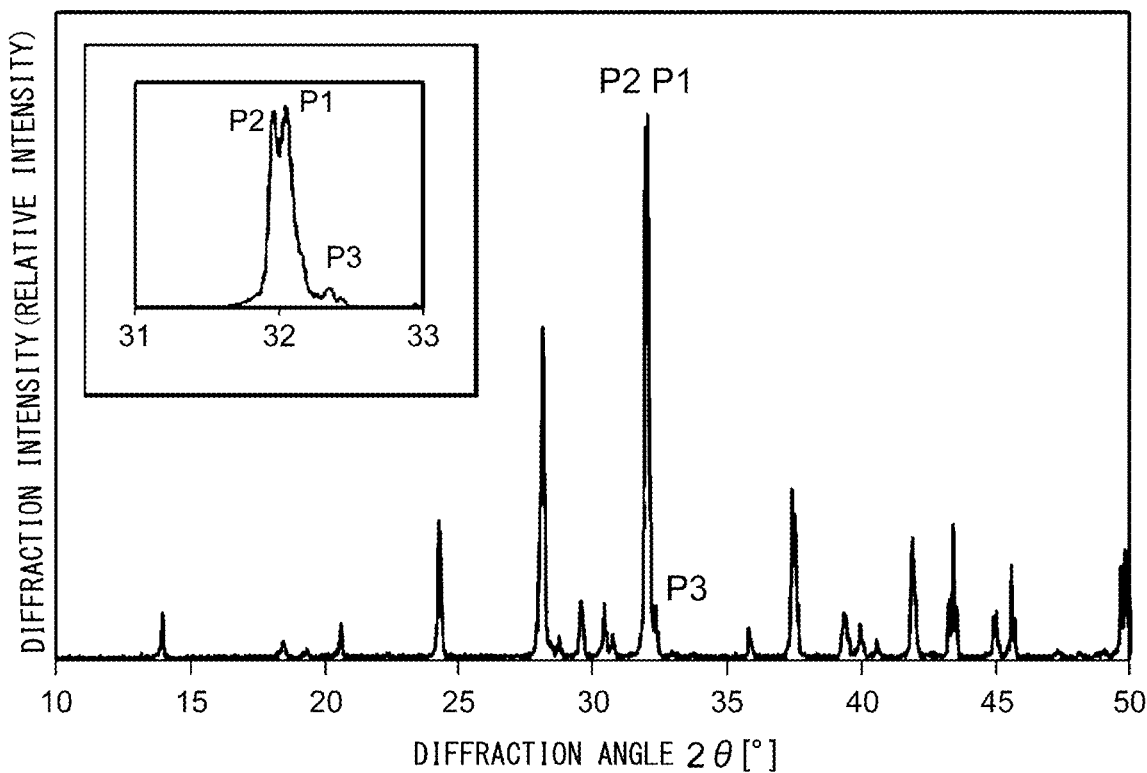
FIG. 28 illustrates an X-ray diffraction pattern of a phosphor according to Example 4.

FIG. 28 illustrates an X-ray diffraction pattern of the phosphor according to Example 4. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.48 Å that takes the occupancy of potassium and lithium occupying the A sites into consideration is greater by 26% than an ionic radius 1.17 Å of $Eu^{2+}$ occupying the B site.

Figure 29:
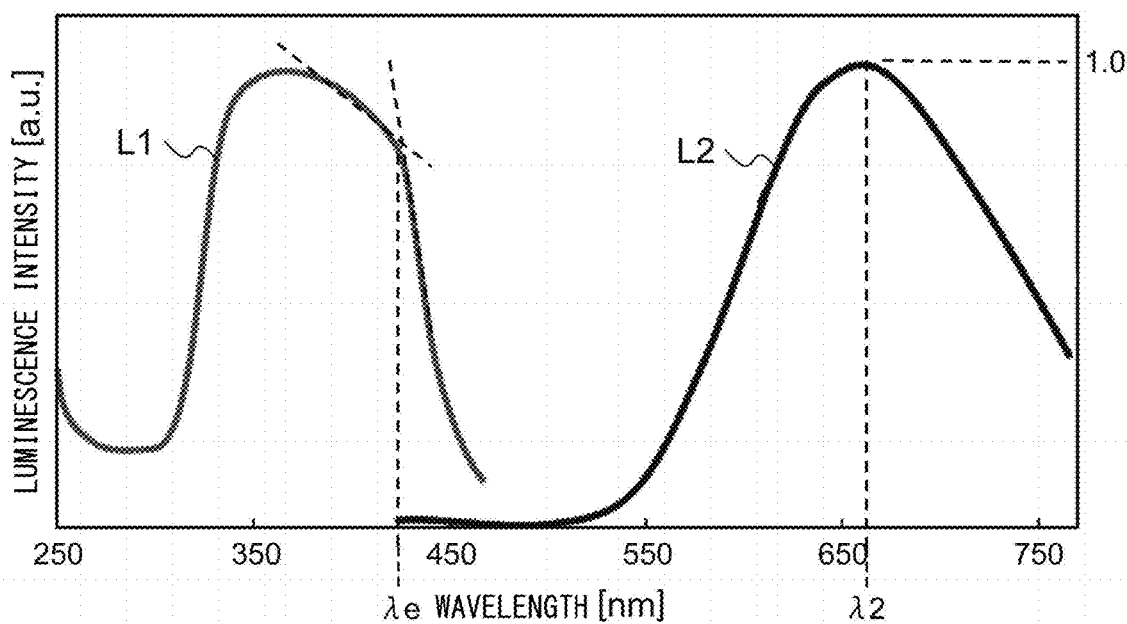
FIG. 29 illustrates an excitation spectrum and an emission spectrum of the phosphor according to Example 4.

FIG. 29 illustrates an excitation spectrum and an emission spectrum of the phosphor according to Example 4. The excitation spectrum and the emission spectrum were measured in a method similar to that in Example 1.

As illustrated in FIG. 29, the excitation spectrum L1 of the phosphor according to Example 4 has a peak wavelength $\lambda 1$ in a range of 330 nm to 420 nm, or more specifically, in a range of 350 nm to 390 nm. The wavelength $\lambda e$ at the excitation edge is approximately 425 nm, and the energy at that wavelength is 2.917 eV. Meanwhile, the emission spectrum L2 has a peak wavelength $\lambda 2$ of 659 nm, and the energy at the peak wavelength $\lambda 2$ is 1.881 eV. Accordingly, the Stokes shift is 1.036 eV. The chromaticity coordinates (cx,cy) of the light emitted by this phosphor are (0.511, 0.383).

Example 5

In a phosphor according to Example 5, elements constituting a crystal structure $ABX_3$ of an emission site are $K^+$ (0.95) and $Ag^+$ (0.05) for cations A, $Eu^{2+}$ for a cation B, and $O^{2-}$ and F for anions X. A cation M constituting a tetrahedron $MO_4$ connecting perovskite structures of the emission site is $P^{5+}$.

The phosphor according to Example 5 was manufactured through the following method. First, KF, AgF, and $K_2CO_3$ powders were dried for two hours at 150° C. Then, KF, $K_2CO_3$, AgF, $CaHPO_4$, $(NH_3)_2HPO_4$, and $Eu_2O_3$ were precisely measured in a glove box filled with dry $N_2$ to achieve a stoichiometric ratio of 0.90:0.500:0.10:0.960:0.040:0.020 (mol), and this was crushed and mixed in an alumina mortar to obtain a starting powder mixture. Processes similar to those in Example 1 were carried out thereafter to obtain the phosphor according to Example 5. The composition of the powder sample obtained in Example 5 was analyzed in a method similar to that in Example 1. The result revealed that the phosphor according to Example 5 had a composition ratio of $(K_{0.90},Ag_{0.10})F \cdot Ca_{0.96}KPO_4:Eu^{2+}_{0.04}$.

Figure 30:
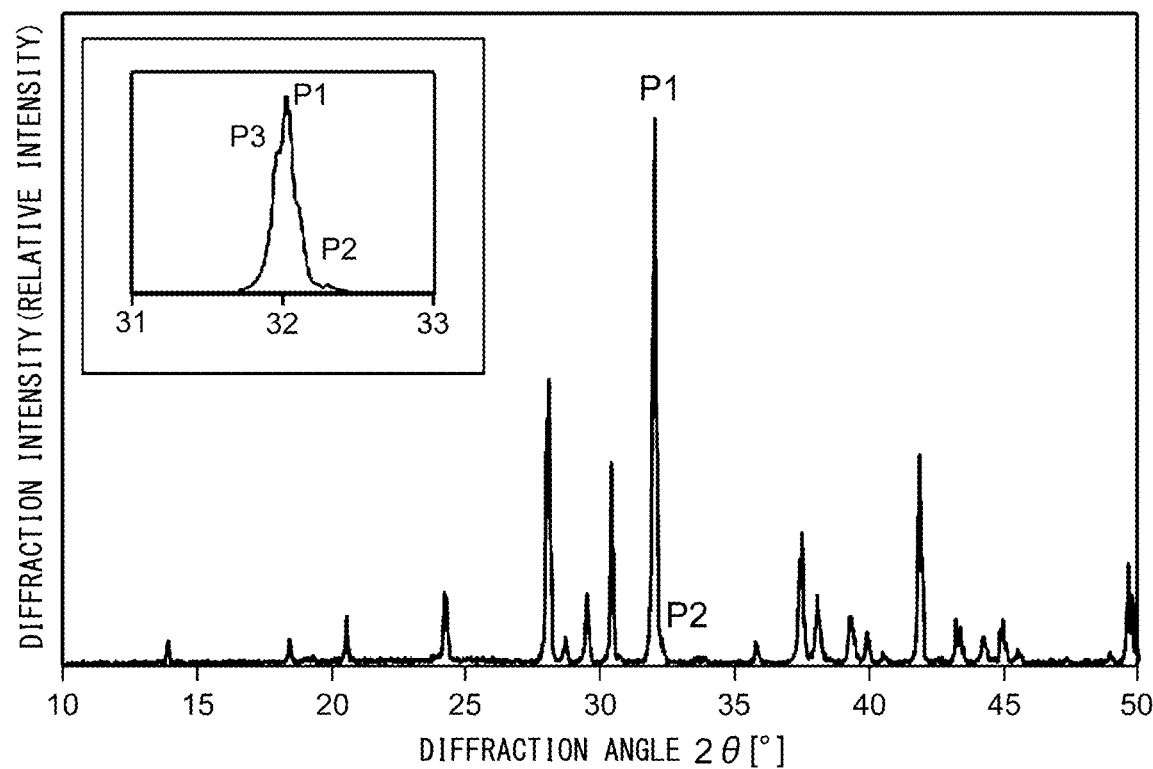
FIG. 30 illustrates an X-ray diffraction pattern of a phosphor according to Example 5.

FIG. 30 illustrates an X-ray diffraction pattern of the phosphor according to Example 5. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.50 Å that takes the occupancy of potassium and silver occupying the A sites into consideration is greater by 28% than an ionic radius 1.17 Å of $Eu^{2+}$ occupying the B site.

Figure 31:
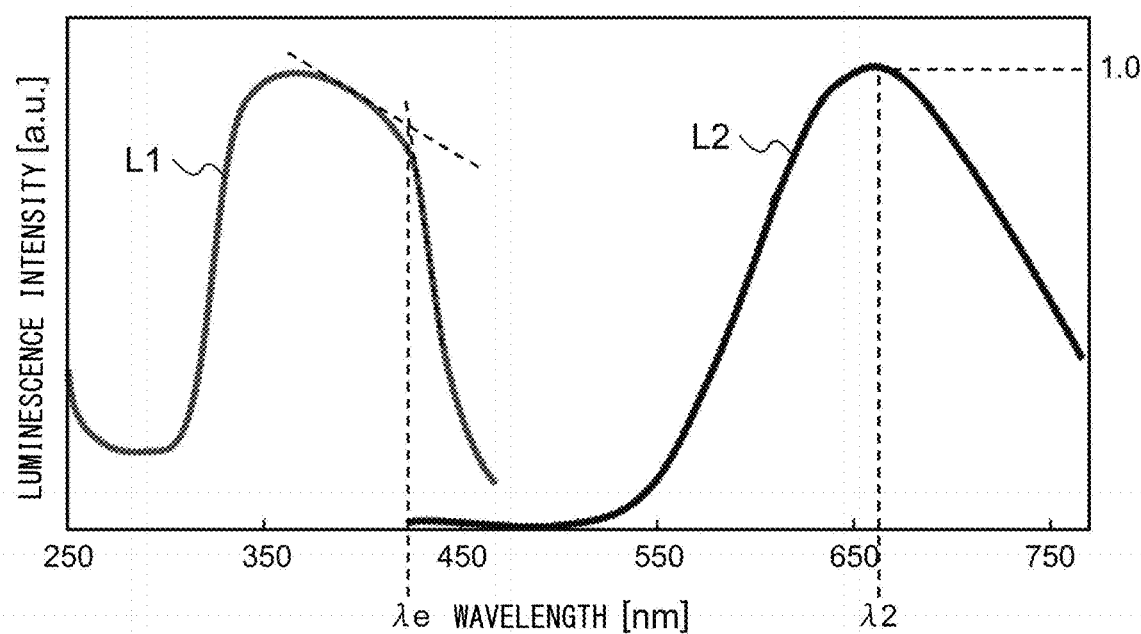
FIG. 31 illustrates an excitation spectrum and an emission spectrum of the phosphor according to Example 5.

FIG. 31 illustrates an excitation spectrum and an emission spectrum of the phosphor according to Example 5. The excitation spectrum and the emission spectrum were measured in a method similar to that in Example 1.

As illustrated in FIG. 31, the excitation spectrum L1 of the phosphor according to Example 5 has a peak wavelength $\lambda 1$ in a range of 330 nm to 420 nm, or more specifically, in a range of 350 nm to 390 nm. The wavelength $\lambda e$ at the excitation edge is approximately 423 nm, and the energy at that wavelength is 2.931 eV. Meanwhile, the emission spectrum L2 has a peak wavelength $\lambda 2$ of 662 nm, and the energy at the peak wavelength $\lambda 2$ is 1.873 eV. Accordingly, the Stokes shift is 1.058 eV. The chromaticity coordinates (cx,cy) of the light emitted by this phosphor are (0.610, 0.374).

Example 6

In a phosphor according to Example 6, elements constituting a crystal structure $ABX_3$ of an emission site are $K^+$ for cations A, $Eu^{2+}$ (0.97) and $Yb^{2+}$ (0.03) for a cation B, and $O^{2-}$ and $F^-$ for anions X. A cation M constituting a tetrahedron $MO_4$ connecting perovskite structures of the emission site is $P^{5+}$.

The phosphor according to Example 6 was manufactured through the following method. First, KF and $K_2CO_3$ powders were dried for two hours at 150° C. Then, KF, $K_2CO_3$, $CaHPO_4$, $(NH_3)_2HPO_4$, $Eu_2O_3$, and $Yb_2O_3$ were precisely measured in a glove box filled with dry $N_2$ to achieve a stoichiometric ratio of 1.0000:0.5000:0.9700:0.030:0.0145:0.0005 (mol), and this was crushed and mixed in an alumina mortar to obtain a starting powder mixture. Processes similar to those in Example 1 were carried out thereafter to obtain the phosphor according to Example 6. The composition of the powder sample obtained in Example 6 was analyzed in a method similar to that in Example 1. The result revealed that the phosphor according to Example 6 had a composition ratio of $KF \cdot Ca_{0.97}KPO_4:Eu^{2+}_{0.029},Yb^{2+}_{0.001}$.

Figure 32:
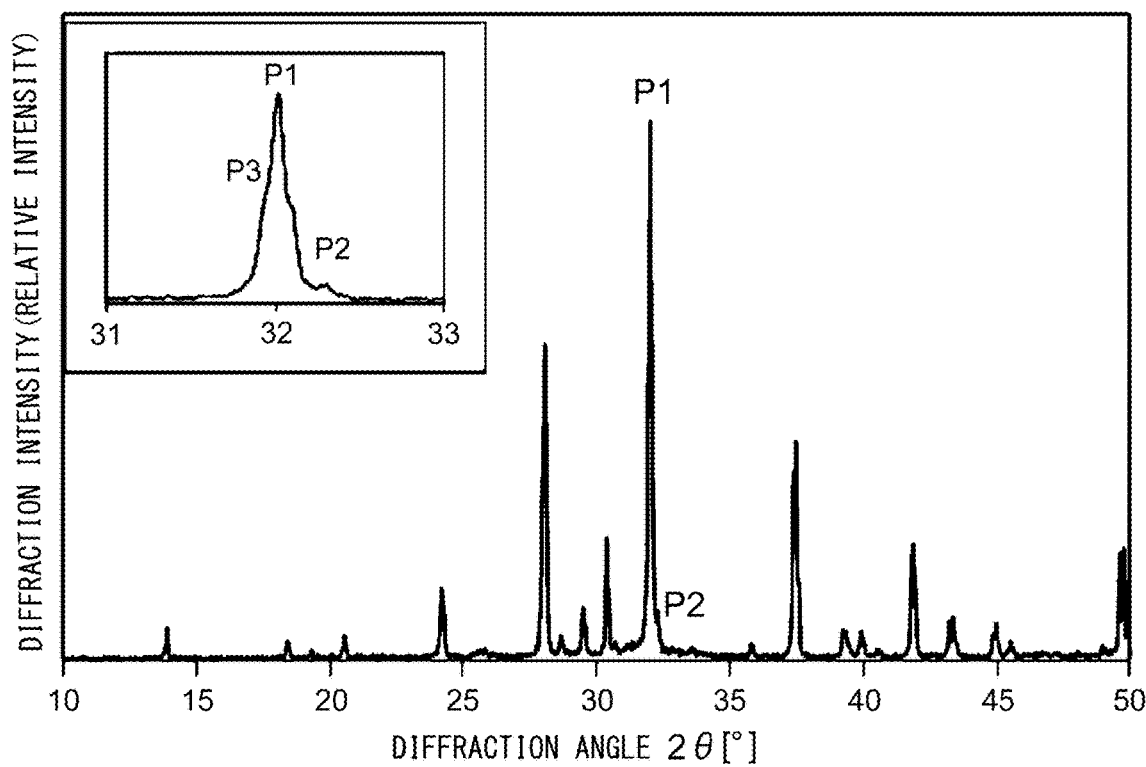
FIG. 32 illustrates an X-ray diffraction pattern of a phosphor according to Example 6.

FIG. 32 illustrates an X-ray diffraction pattern of the phosphor according to Example 6. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.51 Å of potassium occupying the A sites is greater by 29% than a mean ionic radius 1.17 Å that takes the occupancy of $Eu^{2+}$ and $Yb^{2+}$ occupying the B site into consideration.

Figure 33:
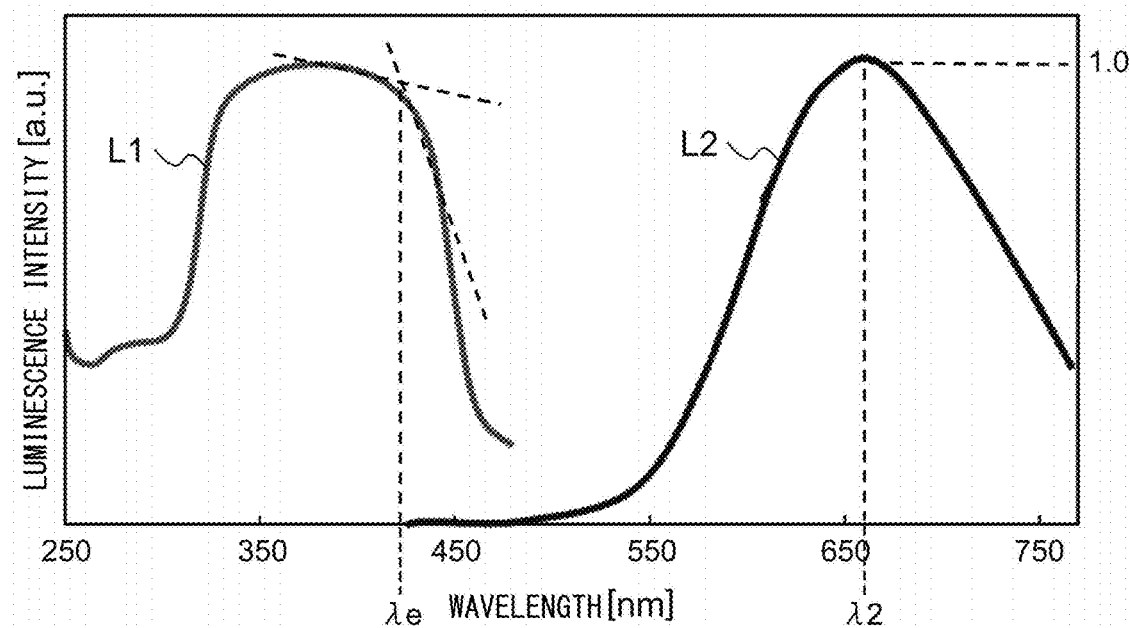
FIG. 33 illustrates an excitation spectrum and an emission spectrum of the phosphor according to Example 6.

FIG. 33 illustrates an excitation spectrum and an emission spectrum of the phosphor according to Example 6. The excitation spectrum and the emission spectrum were measured in a method similar to that in Example 1.

As illustrated in FIG. 33, the excitation spectrum L1 of the phosphor according to Example 6 has a peak wavelength $\lambda 1$ in a range of 330 nm to 420 nm, or more specifically, in a range of 350 nm to 390 nm. The wavelength $\lambda e$ at the excitation edge is approximately 421 nm, and the energy at that wavelength is 2.945 eV. Meanwhile, the emission spectrum L2 has a peak wavelength $\lambda 2$ of 661 nm, and the energy at the peak wavelength $\lambda 2$ is 1.876 eV. Accordingly, the Stokes shift is 1.069 eV. The chromaticity coordinates (cx,cy) of the light emitted by this phosphor are (0.605, 0.380).

Example 7

In a phosphor according to Example 7, elements constituting a crystal structure $ABX_3$ of an emission site are $K^+$ for cations A, $Eu^{2+}$ (0.97) and $Ce^{3+}$ (0.03) for a cation B, and $O^{2-}$ and $F^-$ for anions X. A cation M constituting a tetrahedron $MO_4$ connecting perovskite structures of the emission site is $P^{5+}$.

The phosphor according to Example 7 was manufactured through the following method. First, KF and $K_2CO_3$ powders were dried for two hours at 150° C. Then, KF, $K_2CO_3$, $CaHPO_4$, $(NH_3)_2HPO_4$, $Eu_2O_3$, and $CeO_2$ were precisely measured in a glove box filled with dry $N_2$ to achieve a stoichiometric ratio of 1.0000:0.4995:0.9700:0.0300:0.0145:0.001 (mol), and this was crushed and mixed in an alumina mortar to obtain a starting powder mixture. Processes similar to those in Example 1 were carried out thereafter to obtain the phosphor according to Example 7. The composition of the powder sample obtained in Example 7 was analyzed in a method similar to that in Example 1. The result revealed that the phosphor according to Example 7 had a composition ratio of $KF \cdot Ca_{0.97}KPO_4:Eu^{2+}_{0.029}, Ce^{3+}_{0.001}$.

Figure 34:
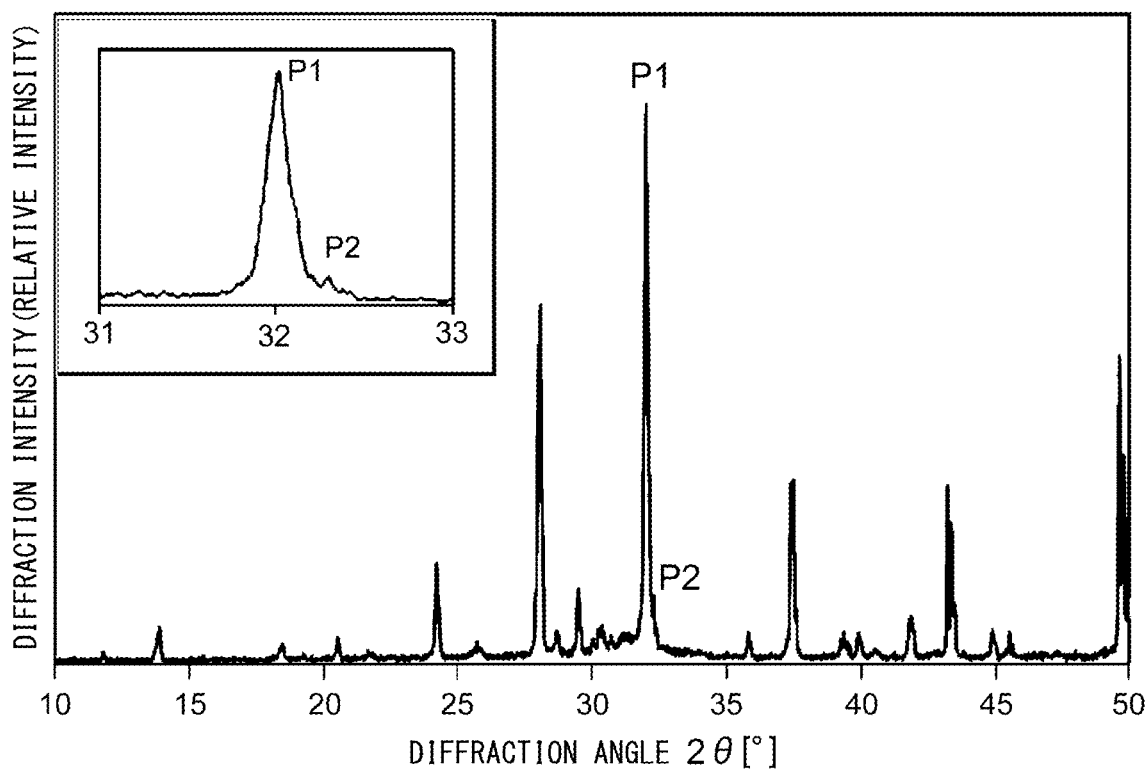
FIG. 34 illustrates an X-ray diffraction pattern of a phosphor according to Example 7.

FIG. 34 illustrates an X-ray diffraction pattern of the phosphor according to Example 7. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. A mean ionic radius 1.51 Å of potassium occupying the A sites is greater by 29% than a mean ionic radius 1.17 Å that takes the occupancy of $Eu^{2+}$ and $Ce^{3+}$ occupying the B site into consideration.

Figure 35:
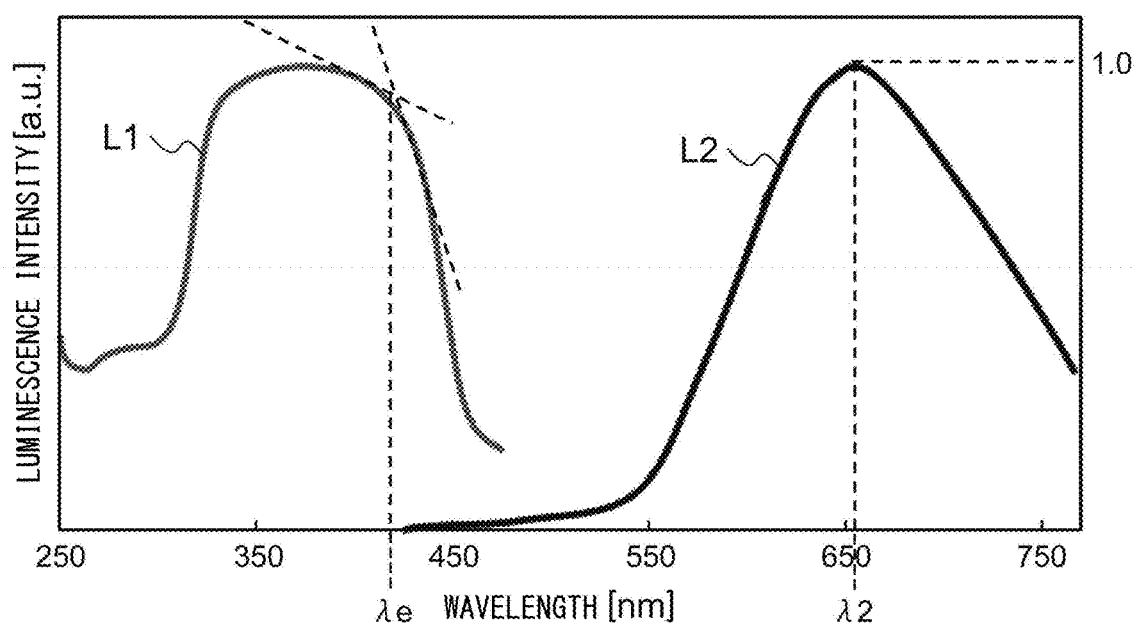
FIG. 35 illustrates an excitation spectrum and an emission spectrum of the phosphor according to Example 7.

FIG. 35 illustrates an excitation spectrum and an emission spectrum of the phosphor according to Example 7. The excitation spectrum and the emission spectrum were measured in a method similar to that in Example 1.

As illustrated in FIG. 35, the excitation spectrum L1 of the phosphor according to Example 7 has a peak wavelength λ1 in a range of 330 nm to 420 nm, or more specifically, in a range of 350 nm to 390 nm. The wavelength λe at the excitation edge is approximately 418 nm, and the energy at that wavelength is 2.966 eV. Meanwhile, the emission spectrum L2 has a peak wavelength λ2 of 655 nm, and the energy at the peak wavelength λ2 is 1.893 eV. Accordingly, the Stokes shift is 1.073 eV. The chromaticity coordinates (cx,cy) of the light emitted by this phosphor are (0.608, 0.380).

Example 8

In a phosphor according to Example 8, elements constituting a crystal structure $ABX_3$ of an emission site are $K^+$ for cations A, $Eu^{2+}$ for a cation B, and $O^{2-}$ and $F^-$ (0.995):Cl (0.005) for anions X. A cation M constituting a tetrahedron $MO_4$ connecting perovskite structures of the emission site is $P^{5+}$.

The phosphor according to Example 8 was manufactured through the following method. First, KF and $K_2CO_3$ powders were dried for two hours at 150° C. Then, KF, $K_2CO_3$, KCl, $CaHPO_4$, $(NH_3)_2HPO_4$, and $Eu_2O_3$ were precisely measured in a glove box filled with dry $N_2$ to achieve a stoichiometric ratio of 0.995:0.500:0.005:0.990:0.010:0.005 (mol), and this was crushed and mixed in an alumina mortar to obtain a starting powder mixture. Processes similar to those in Example 1 were carried out thereafter to obtain the phosphor according to Example 8. The composition of the powder sample obtained in Example 8 was analyzed in a method similar to that in Example 1. The result revealed that the phosphor according to Example 8 had a composition ratio of $K(F_{0.995},Cl_{0.005}) \cdot Ca_{0.99}KPO_4:Eu^{2+}_{0.01}$.

Figure 36:
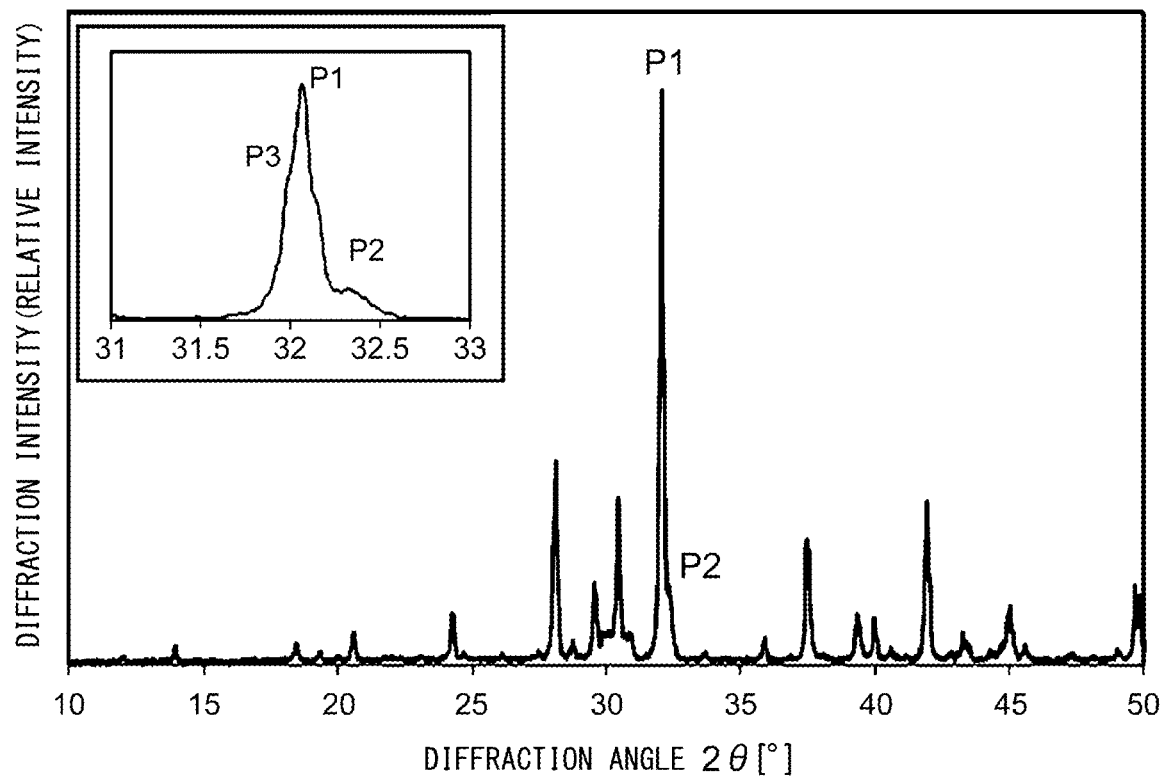
FIG. 36 illustrates an X-ray diffraction pattern of a phosphor according to Example 8.

FIG. 36 illustrates an X-ray diffraction pattern of the phosphor according to Example 8. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. An ionic radius 1.51 Å of potassium occupying the A sites is greater by 29% than an ionic radius 1.17 Å of $Eu^{2+}$ occupying the B site.

Figure 37:
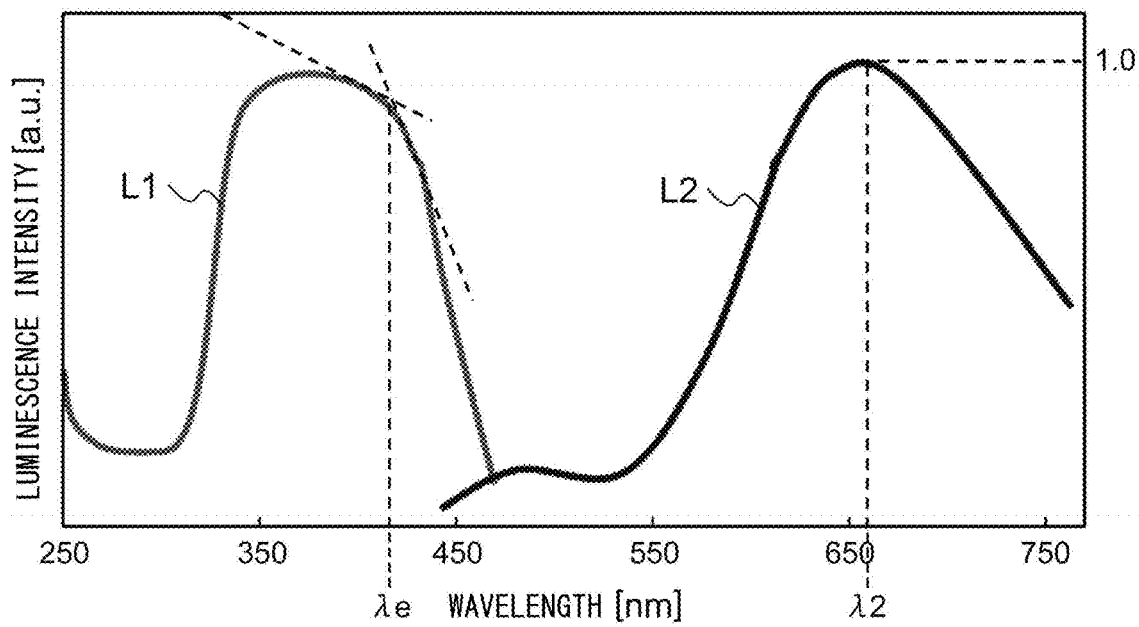
FIG. 37 illustrates an excitation spectrum and an emission spectrum of the phosphor according to Example 8.

FIG. 37 illustrates an excitation spectrum and an emission spectrum of the phosphor according to Example 8. The excitation spectrum and the emission spectrum were measured in a method similar to that in Example 1.

As illustrated in FIG. 37, the excitation spectrum L1 of the phosphor according to Example 8 has a peak wavelength λ1 in a range of 330 nm to 420 nm, or more specifically, in a range of 350 nm to 390 nm. The wavelength λe at the excitation edge is approximately 414 nm, and the energy at that wavelength is 2.995 eV. Meanwhile, the emission spectrum L2 has a peak wavelength λ2 of 658 nm, and the energy at the peak wavelength λ2 is 1.884 eV. Accordingly, the Stokes shift is 1.111 eV. The chromaticity coordinates (cx,cy) of the light emitted by this phosphor are (0.553, 0.378).

Example 9

In a phosphor according to Example 9, elements constituting a crystal structure $ABX_3$ of an emission site are $K^+$ for cations A, $Eu^{2+}$ for a cation B, and $O^{2-}$ and $F^-$ for anions X. A cation M constituting a tetrahedron $MO_4$ connecting perovskite structures of the emission site is $P^{5+}$ (0.999) and $V^{5+}$ (0.001).

The phosphor according to Example 9 was manufactured through the following method. First, KF and $K_2CO_3$ powders were dried for two hours at 150° C. Then, KF, $K_2CO_3$, $CaHPO_4$, $V_2O_5$, $(NH_3)_2HPO_4$, and $Eu_2O_3$ were precisely measured in a glove box filled with dry $N_2$ to achieve a stoichiometric ratio of 1.000:0.500:0.980:0.001:0.018:0.010 (mol), and this was crushed and mixed in an alumina mortar to obtain a starting powder mixture. Processes similar to those in Example 1 were carried out thereafter to obtain the phosphor according to Example 9. The composition of the powder sample obtained in Example 9 was analyzed in a method similar to that in Example 1. The result revealed that the phosphor according to Example 9 had a composition ratio of $KF \cdot Ca_{0.98}K(P_{0.999},V_{0.001})O_4:Eu^{2+}_{0.02}$.

Figure 38:
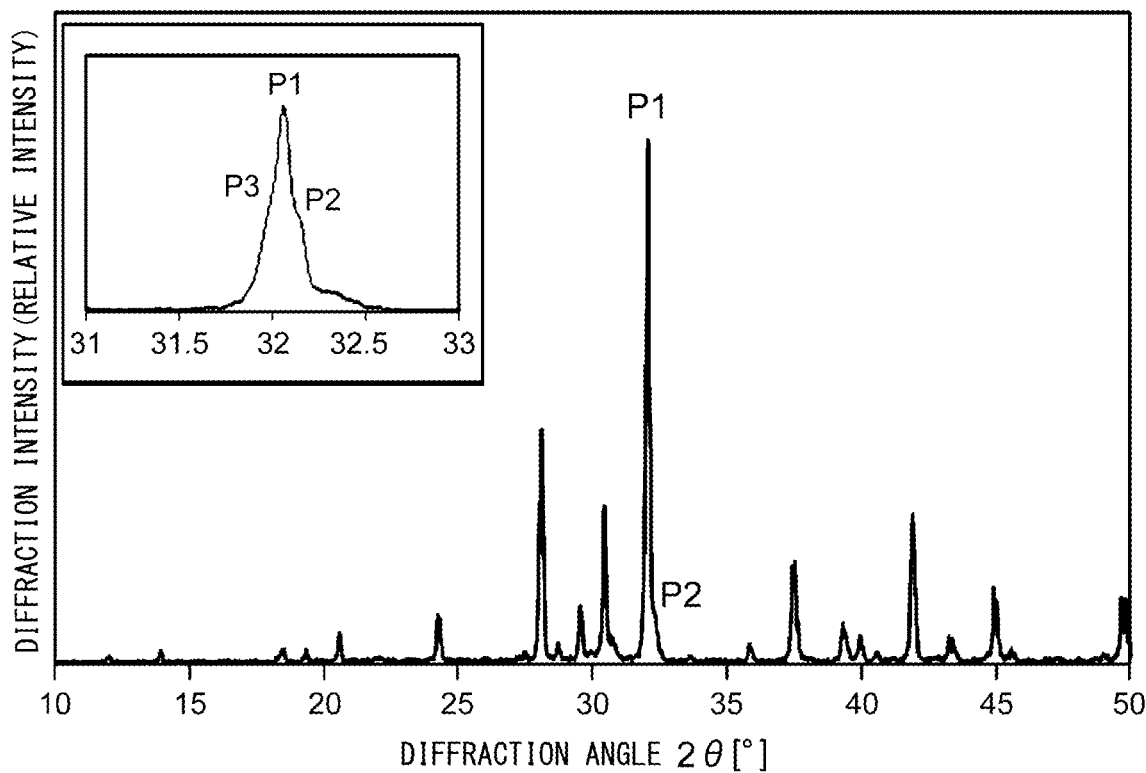
FIG. 38 illustrates an X-ray diffraction pattern of a phosphor according to Example 9.

FIG. 38 illustrates an X-ray diffraction pattern of the phosphor according to Example 9. The measurement was carried out under the same condition as in Example 2. P1, P2, and P3 are so observed as to overlap each other, and thus an enlarged pattern of this portion is inserted in the drawing. The result confirmed that a diffraction pattern similar to that in Example 1 was obtained and that the crystal structure was identical to that in Example 1. Accordingly, the site occupied by Eu was the B site, as in Example 1, and the coordination structure was a perovskite structure. An ionic radius 1.51 Å of potassium occupying the A sites is greater by 29% than an ionic radius 1.17 Å of $Eu^{2+}$ occupying the B site.

Figure 39:
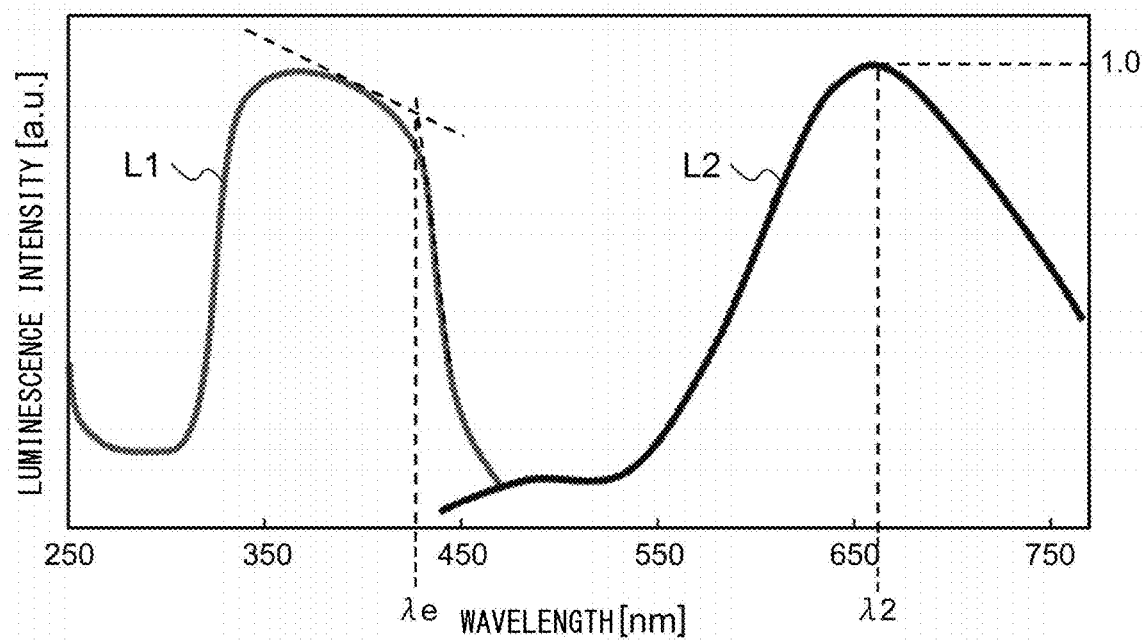
FIG. 39 illustrates an excitation spectrum and an emission spectrum of the phosphor according to Example 9.

FIG. 39 illustrates an excitation spectrum and an emission spectrum of the phosphor according to Example 9. The excitation spectrum and the emission spectrum were measured in a method similar to that in Example 1.

As illustrated in FIG. 39, the excitation spectrum L1 of the phosphor according to Example 9 has a peak wavelength λ1 in a range of 330 nm to 420 nm, or more specifically, in a range of 350 nm to 390 nm. The wavelength λe at the excitation edge is approximately 426 nm, and the energy at that wavelength is 2.910 eV. Meanwhile, the emission spectrum L2 has a peak wavelength λ2 of 658 nm, and the energy at the peak wavelength λ2 is 1.884 eV. Accordingly, the Stokes shift is 1.034 eV. The chromaticity coordinates (cx,cy) of the light emitted by this phosphor are (0.555, 0.372).

Thus far, the present invention has been described with reference to the foregoing embodiments and examples. The present invention, however, is not limited to the foregoing embodiments and examples and encompasses an embodiment or an example obtained by combining or replacing configurations of the foregoing embodiments or examples as appropriate. In addition, it is also possible to change the combinations or processing procedures in the embodiments and examples or to make modifications such as various design changes to the embodiments or examples on the basis of the knowledge of a person skilled in the art, and an embodiment obtained by making such modifications is also encompassed by the scope of the present invention.

What is claimed is:

1. A phosphor, wherein
an emission site has a perovskite crystal structure expressed by $ABX_3$, A and B each being a cation, X being an anion,
an emission element is located at a B site serving as a body center of the perovskite crystal structure, and
the X includes an anion including two or more elements selected from the group consisting of oxygen, halogen, and nitrogen with nitrogen being essential.

2. The phosphor according to claim 1, wherein the X includes two or more types of anions.

3. The phosphor according to claim 1, wherein the anions include nitrogen, oxygen and fluorine.

4. The phosphor according to claim 1, wherein
a cation located at an A site of the perovskite crystal structure has an ionic radius $I_A$ that is greater than an ionic radius $I_B$ of the cation located at the B site.

5. The phosphor according to claim 1, wherein
oxygen serving as an anion located at an X site of the perovskite crystal structure and oxygen of a $MO_4$ (M is a trivalent, tetravalent, or pentavalent metallic element) tetrahedron structure are shared.

6. The phosphor according to claim 1, wherein
the phosphor is excited by near-ultraviolet light or short-wavelength visible light at no greater than 420 nm.

7. The phosphor according to claim 1, wherein
the phosphor emits red light having a peak wavelength in an emission spectrum of no less than 600 nm.

8. The phosphor according to claim 1, wherein
a Stokes shift is 0.8 eV to 1.2 eV.

* * * * *